US012640549B2

(12) United States Patent
Hess et al.

(10) Patent No.: US 12,640,549 B2
(45) Date of Patent: May 26, 2026

(54) SYSTEM AND METHOD FOR DELIVERY ELEMENT SUPPORT

(71) Applicant: Melitron Corporation, Guelph (CA)

(72) Inventors: Kristoffer Hess, Guelph (CA); Michael S. Turner, Guelph (CA)

(73) Assignee: Melitron Corporation, Guelph (CA)

( * ) Notice: Subject to any disclaimer, the term of this patent is extended or adjusted under 35 U.S.C. 154(b) by 593 days.

(21) Appl. No.: 18/320,565

(22) Filed: May 19, 2023

(65) Prior Publication Data

US 2023/0378738 A1     Nov. 23, 2023

Related U.S. Application Data

(60) Provisional application No. 63/343,762, filed on May 19, 2022.

(51) Int. Cl.
*H01G 11/02*        (2013.01)
*B60L 53/14*        (2019.01)
        (Continued)

(52) U.S. Cl.
CPC .............. *H02G 11/02* (2013.01); *B60L 53/14* (2019.02); *B60L 53/16* (2019.02); *B60L 53/18* (2019.02);
        (Continued)

(58) Field of Classification Search
CPC .... H02G 11/02; H02G 11/003; H02G 11/006; H01B 7/06; H01B 7/065; B60L 53/14;
        (Continued)

(56) References Cited

U.S. PATENT DOCUMENTS

| | | | | |
|---|---|---|---|---|
| 1,870,510 A | * | 8/1932 | Hespeler | .............. H02G 11/003 |
| | | | | 248/323 |
| 3,802,351 A | * | 4/1974 | Pascuzzi | ................. B66C 13/12 |
| | | | | 104/112 |

(Continued)

FOREIGN PATENT DOCUMENTS

| | | | | |
|---|---|---|---|---|
| CA | 3149271 A1 | 3/2021 | | |
| CH | 717908 B1 | * 4/2022 | ......... B65H 75/4428 | |

(Continued)

OTHER PUBLICATIONS

URL for AKON Industrial Curtain Track (EV Charger Cable Retractor); accessed on Apr. 13, 2023; https://www.industrialcurtaintrack.com/product/ev-charger-cable-retractor.

*Primary Examiner* — S. Joseph Morano
*Assistant Examiner* — James William Jones
(74) *Attorney, Agent, or Firm* — Gowling WLG (Canada) LLP

(57)        ABSTRACT

A system including a structure assembly and a delivery element extending between a free end thereof positionable distal from the structure assembly and a secured end thereof attached to the structure assembly. The delivery element is movable between an extended condition and a retracted condition. The system also includes a line element and a number of bracket assemblies connecting the line element and the delivery element. The line element extends between an inner end thereof secured to the structure assembly and an outer end thereof secured to the delivery element proximal to the free end. The line element is movable relative to the delivery element as the delivery element is moved between the extended and retracted conditions thereof, and is slidingly receivable in apertures in the bracket assemblies as the delivery element is moved between the extended and retracted conditions thereof.

20 Claims, 20 Drawing Sheets

(51) Int. Cl.

| | |
|---|---|
| *B60L 53/16* | (2019.01) |
| *B60L 53/18* | (2019.01) |
| *B60L 53/30* | (2019.01) |
| *B60L 53/31* | (2019.01) |
| *H01B 7/06* | (2006.01) |
| *H02G 11/00* | (2006.01) |
| *H02G 11/02* | (2006.01) |

(52) U.S. Cl.
CPC ............... *B60L 53/30* (2019.02); *B60L 53/31* (2019.02); *H01B 7/06* (2013.01); *H01B 7/065* (2013.01); *H02G 11/003* (2013.01); *H02G 11/006* (2013.01)

(58) Field of Classification Search
CPC .......... B60L 53/16; B60L 53/18; B60L 53/30; B60L 53/31
USPC ..... 191/12 R, 12.2 R, 12.4, 12.2 A; 320/109
See application file for complete search history.

(56) References Cited

U.S. PATENT DOCUMENTS

| | | | | |
|---|---|---|---|---|
| 4,384,688 | A * | 5/1983 | Smith ................... | H02G 11/02 |
| | | | | 242/379 |
| 9,387,770 | B2 * | 7/2016 | Moribe .................. | B60L 53/18 |
| 9,434,260 | B2 | 9/2016 | Takahashi et al. | |
| 9,975,443 | B2 | 5/2018 | Jefferies et al. | |
| 10,569,055 | B1 * | 2/2020 | Sigsworth ............. | F16L 3/2235 |
| 11,260,767 | B2 * | 3/2022 | Mailloux ................ | B60L 53/16 |
| 11,267,350 | B2 | 3/2022 | Bunker et al. | |
| 2005/0189453 | A1 * | 9/2005 | DeGuevara ........... | H02G 3/305 |
| | | | | 248/68.1 |
| 2015/0014128 | A1 | 1/2015 | Mizuno et al. | |
| 2023/0018577 | A1 | 1/2023 | Naychuck | |

FOREIGN PATENT DOCUMENTS

| | | | | | |
|---|---|---|---|---|---|
| CN | 204669037 | U | | 9/2015 | |
| CN | 205509450 | U | | 8/2016 | |
| CN | 207257396 | U | * | 4/2018 | |
| CN | 208324923 | U | | 1/2019 | |
| CN | 210074669 | U | | 2/2020 | |
| DE | 102011087324 | A1 | | 5/2013 | |
| DE | 102018131934 | A1 | * | 7/2020 | ............. H02G 11/02 |
| GB | 2572469 | A | | 10/2019 | |
| GB | 2597071 | A | * | 1/2022 | ............. B60L 53/31 |
| WO | WO2016088147 | A1 | | 6/2016 | |
| WO | WO2020170442 | A1 | | 8/2020 | |
| WO | WO2020201616 | A1 | | 10/2020 | |
| WO | WO-2022132252 | A1 | * | 6/2022 | ............. B60L 53/55 |
| WO | WO-2022149096 | A1 | * | 7/2022 | ............. H02G 11/00 |
| WO | WO2022184380 | A1 | | 9/2022 | |
| WO | WO2023275428 | A1 | | 1/2023 | |

* cited by examiner

SYSTEM AND METHOD FOR DELIVERY ELEMENT SUPPORT

CROSS-REFERENCE TO RELATED APPLICATION

This application claims the benefit of U.S. Provisional Patent Application No. 63/343,762, filed May 19, 2022, the entirety of which is hereby incorporated herein by reference.

FIELD OF THE INVENTION

The present invention is a system for supporting a delivery element secured at one end thereof to a structure.

BACKGROUND OF THE INVENTION

As is well known in the art, cables used at electric vehicle charging stations typically are simply wound onto a support at the charging unit and then unwound, to a greater or a lesser extent, when in use. The cable typically extends between the charging station and a plug element that may be plugged into a suitable electric receptacle on the electric vehicle. The cable is used to connect a source of electrical energy to batteries in the electric vehicle.

Typically, when in use, the cable may be partially laid on the ground. The user may drag the cable, or part of it, over the ground when the plug element is pulled to the vehicle, and also when the plug element is returned to the charging unit after charging is completed.

In the prior art, cables at electric vehicle charging stations are stored, and then deployed from storage, in much the same way as other types of connectors or delivery devices (e.g., hoses for fuel delivery, or pneumatic or hydraulic hoses). In general, the delivery devices are used to deliver something (e.g., a fluid, or electrical energy) that is available at a support or base to a target destination at which the fluid or energy is delivered, via the delivery device.

Depending on the circumstances, a plug, or nozzle, or fitting may be mounted at a free end of the delivery device. For instance, if electricity or gasoline is to be delivered, then a plug or nozzle is mounted at the free end, to be engaged or secured at the target destination. Alternatively, if the delivery device is a garden hose or an air hose, for example, the delivery device may effect the delivery without engaging or securing the free end to any particular object.

The typical arrangements for storage and deployment of delivery devices have a number of disadvantages. For example, in the prior art, a hook may be provided on which the delivery device may be coiled by the user, when the delivery device is returned to the support. However, in practice, users may not coil the returned delivery device on the hook, or they may not coil the delivery device so that it is ready for the next user. Part of the delivery device may remain lying on the ground, where it may be stepped on, or trip someone.

In addition, depending on the distance from the support to the destination, a user may not be able to move the free end from the support simply by grasping the free end, and pulling. Instead, the user may have to hold the delivery device at an intermediate point in order to pull the free end from the support to the destination. Because the delivery device is often dragged over the ground, it is usually somewhat dirty, so the user will typically get his hands dirty when the user pulls on the delivery device.

From the foregoing, it can be seen that the typical arrangement also subjects the delivery device to wear that over time will wear down an external covering of the delivery device.

In the prior art, the delivery device may be attached at the support at a vertical distance of several feet above the ground, in an attempt to address the problem of the delivery device being dragged on the ground in use. However, this arrangement also has disadvantages, and does not necessarily prevent the delivery device from contacting the ground when in use.

SUMMARY OF THE INVENTION

For the foregoing reasons, there is a need for a delivery element support system and method that overcomes or mitigates one or more of the defects and disadvantages of the prior art.

In its broad aspect, the invention provides a system including a structure assembly and a delivery element extending between a free end thereof positionable distal from the structure assembly and a secured end thereof attached to the structure assembly. The delivery element is movable between an extended condition, in which the free end is located distal to the structure assembly, and a retracted condition, in which the free end is located proximal to the structure assembly.

The system also includes a number of bracket assemblies. Each bracket assembly includes a body portion that is securable to the delivery element and an upper portion mounted to the body portion. The upper portion defines an aperture therein.

In addition, the system includes a line element that extends between an inner end thereof secured to the structure assembly and an outer end thereof secured to the delivery element proximal to the free end. The line element includes an inner portion thereof, at least partially engaged with the structure assembly, and an outer portion thereof that extends between the inner portion and the outer end. The line element is movable relative to the delivery element as the delivery element is moved between the extended and retracted conditions thereof.

The line element is slidingly receivable in the apertures in the upper portions as the delivery element is moved between the extended and retracted conditions thereof, and the outer portion of the line element is correspondingly moved relative to the delivery element, to support the delivery element.

BRIEF DESCRIPTION OF THE DRAWINGS

The invention will be better understood with reference to the attached drawings, in which.

DETAILED DESCRIPTION

Figure 1A:
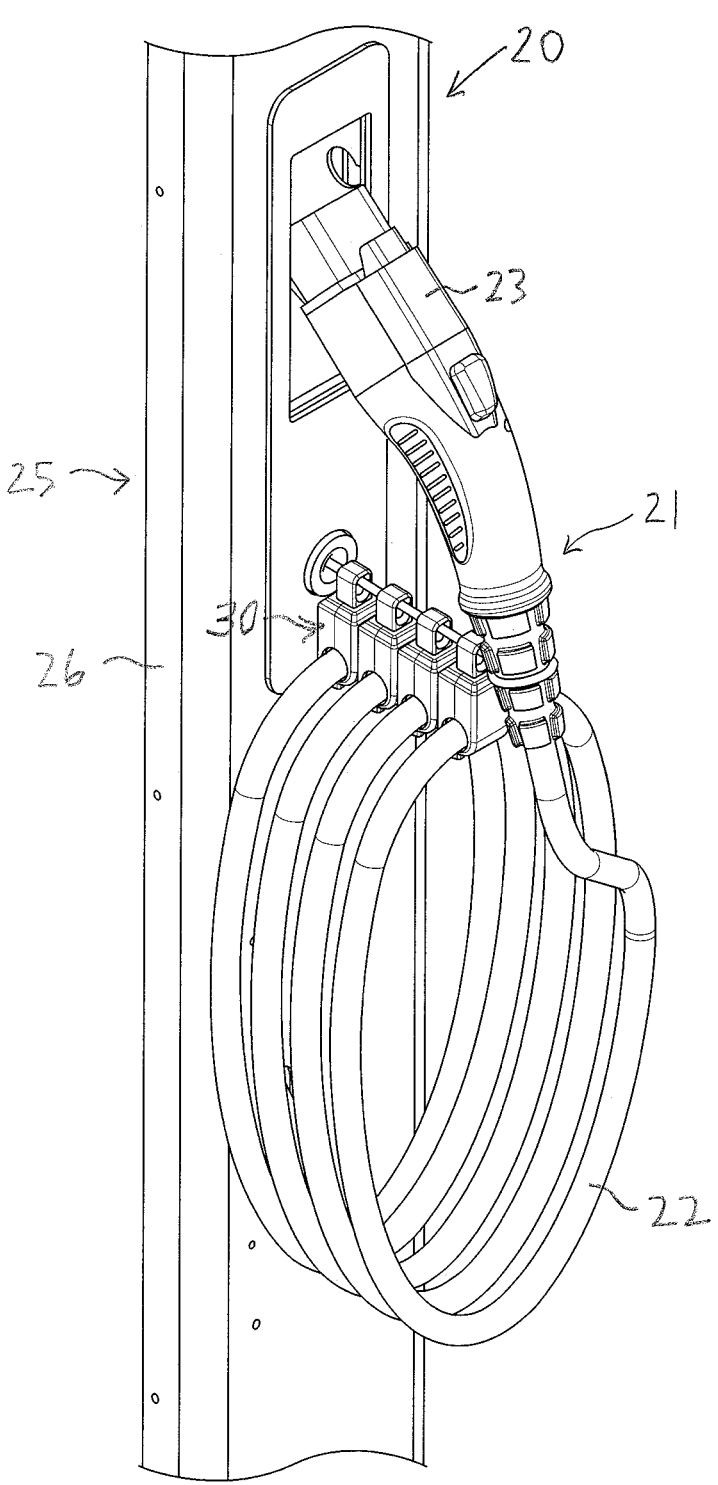
FIG. 1A is an isometric view of an embodiment of a system of the invention in which a delivery element supported by a line element is in a retracted condition.

In the attached drawings, like reference numerals designate corresponding elements throughout. Reference is made to FIGS. 1A-4C to describe an embodiment of a system in accordance with the invention indicated generally by the numeral 20.

Figure 1B:
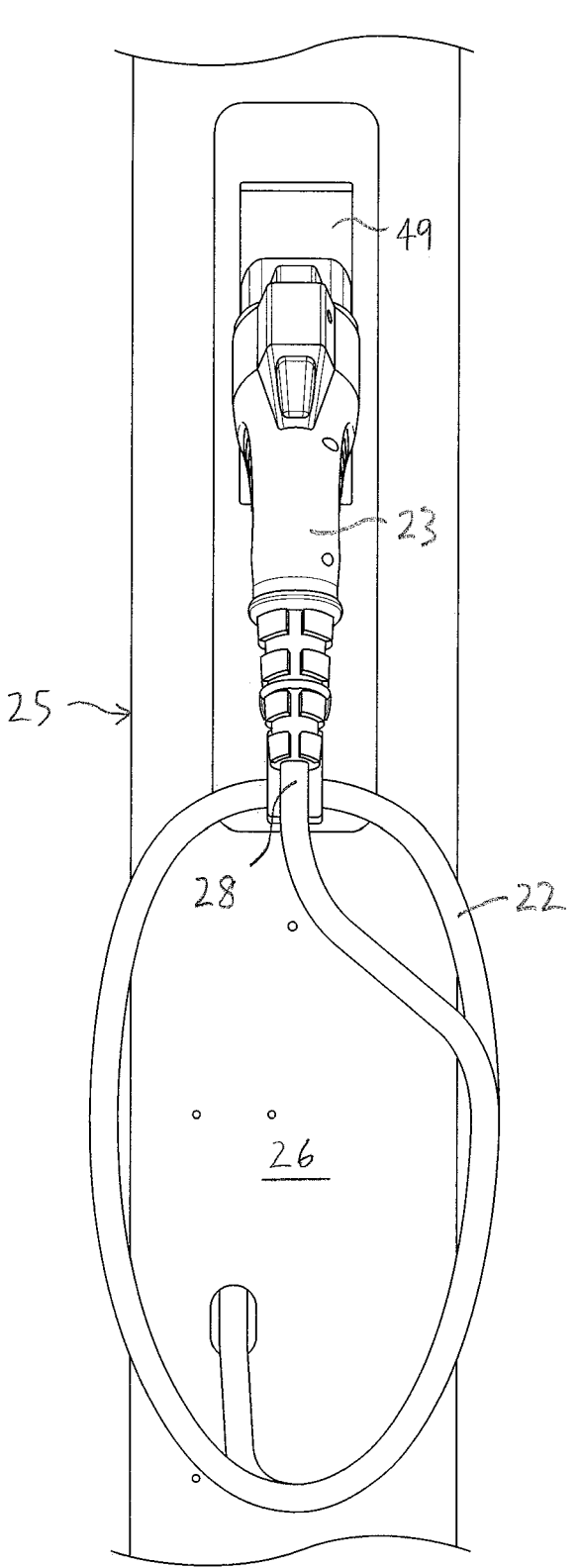
FIG. 1B is a front view of the system of FIG. 1A.
Figure 1C:
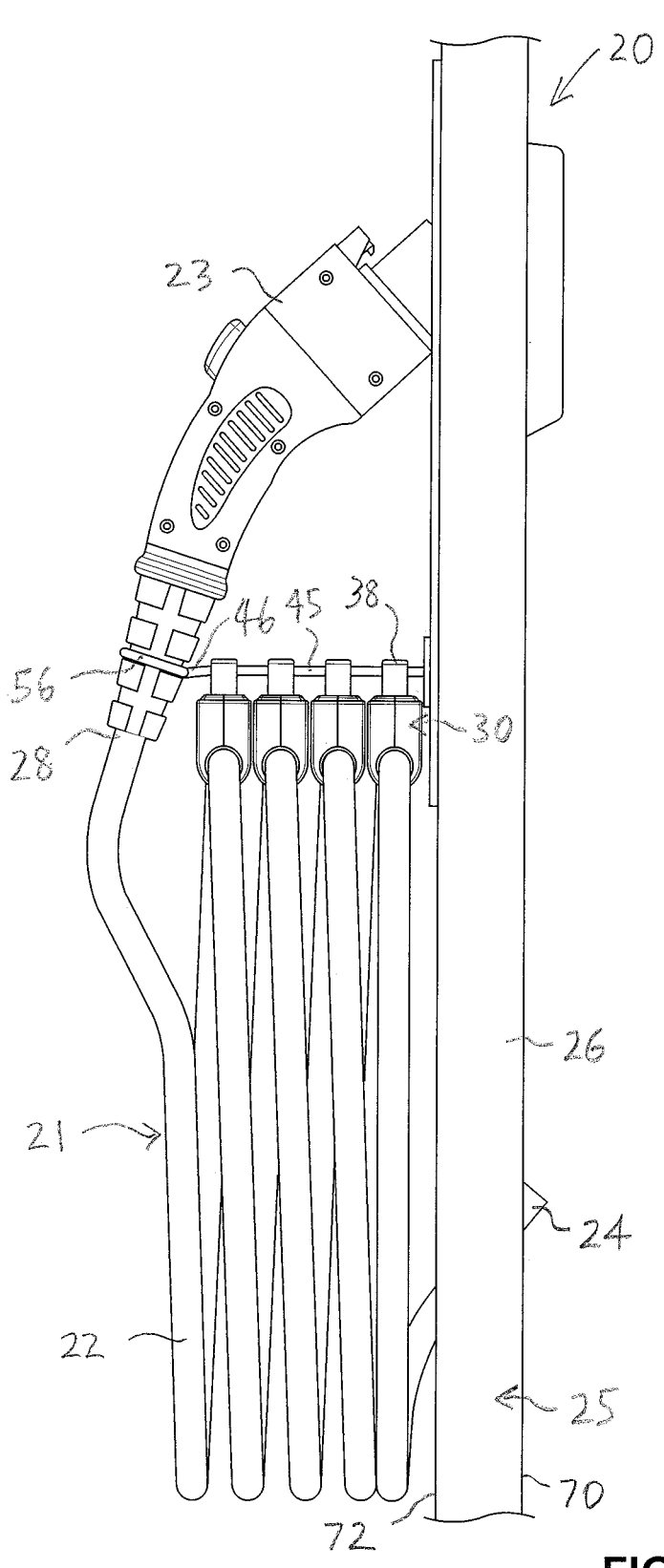
FIG. 1C is a side view of the system of FIGS. 1A and 1B.
Figure 1D:
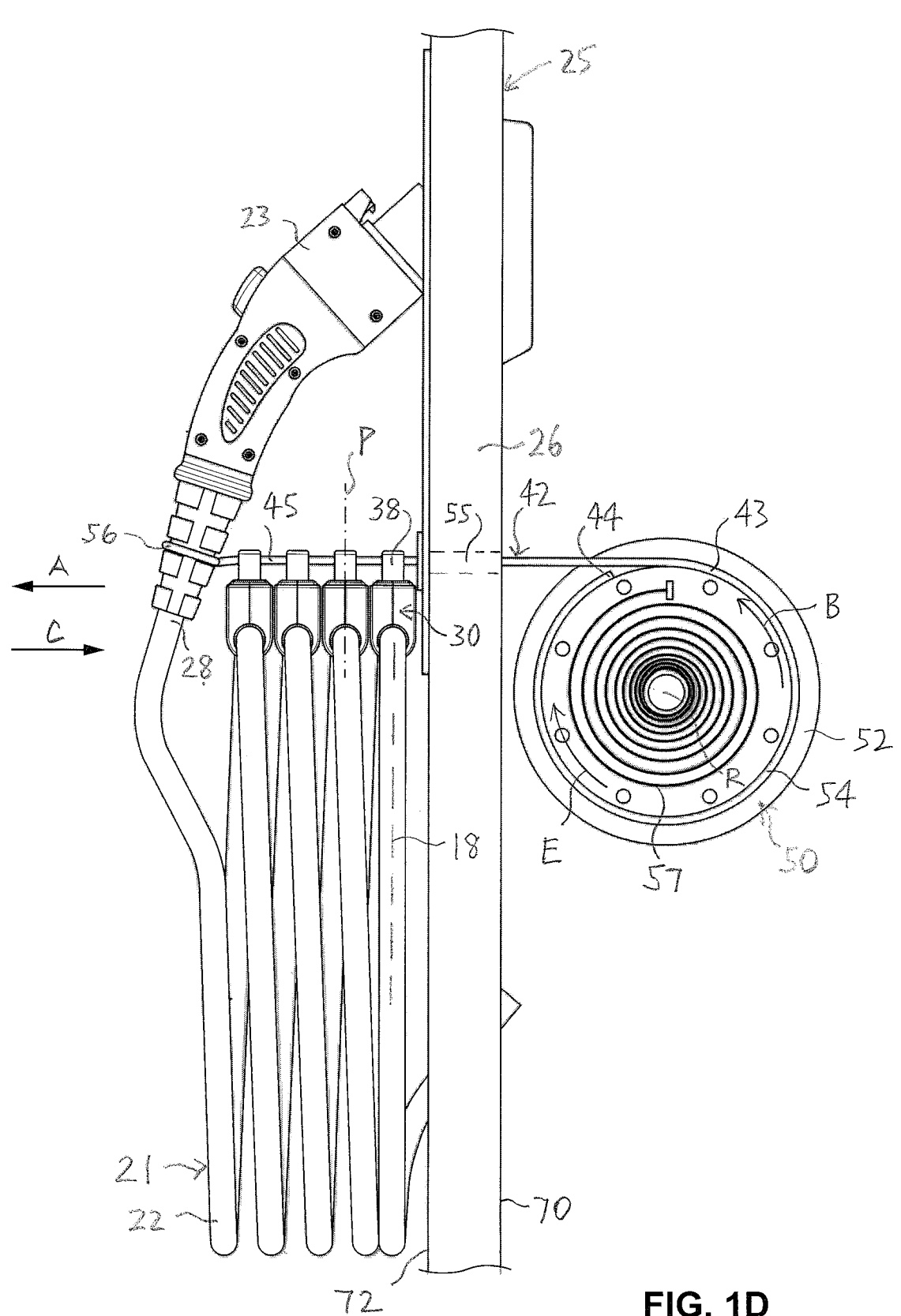
FIG. 1D is a side view of another embodiment of the system of the invention including a reel.
Figure 1E:
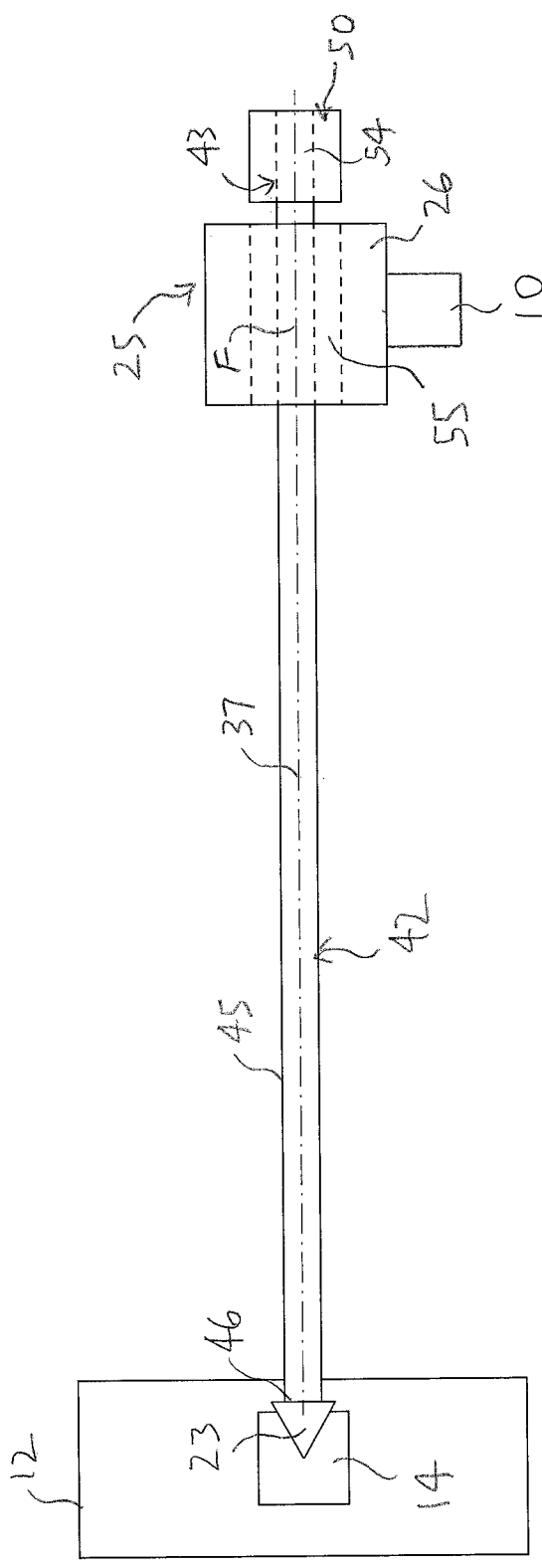
FIG. 1E is a schematic top view of the line element of the system extending between a structure assembly of the system including a structure and a recipient device in which the line element is substantially aligned with a channel in the structure, drawn at a smaller scale.

As will be described, in one embodiment, the system 20 is for conducting electrical energy from a source thereof 10 to a recipient device 12 having an inlet 14 thereon (FIG. 1E). The recipient device 12 may be one or more rechargeable batteries, e.g., located in an electric vehicle (not shown). The system 20 preferably includes a structure assembly 25 via which the electrical energy is accessible from the source 10. Preferably, the system 20 also includes a delivery assembly 21 (FIGS. 1A-1D) for conducting the electrical energy from the structure assembly 25 to the recipient device 12.

In one embodiment, the delivery assembly 21 preferably includes a delivery element 22 and a plug 23. (It will be understood that the delivery element 22 is omitted from FIGS. 1E-1H for clarity of illustration.) The delivery element 22 preferably extends between a free end 28 at which the plug 23 is located for electrical connection with the inlet 14 at the recipient device 12, and a secured end 24 attached to the structure assembly 25 (FIG. 1C). It will also be understood that the secured end 24 is suitably connected with the source 10. The delivery element 22 preferably is movable between an extended condition (FIGS. 4A, 4B), in which the plug 23 is connectable to the inlet 14 and the free end 28 is located distal to the structure assembly 25, and a retracted condition (FIGS. 1A-1D), in which the free end 28 is located proximal to the structure assembly 25.

As will be described, the delivery element 22 may be any type of cable or hose that may be used as a conduit for fluids. In such alternative embodiments, the delivery assembly 21 may include a suitable nozzle or other connection device (not shown) at the free end 28.

Figure 2A:
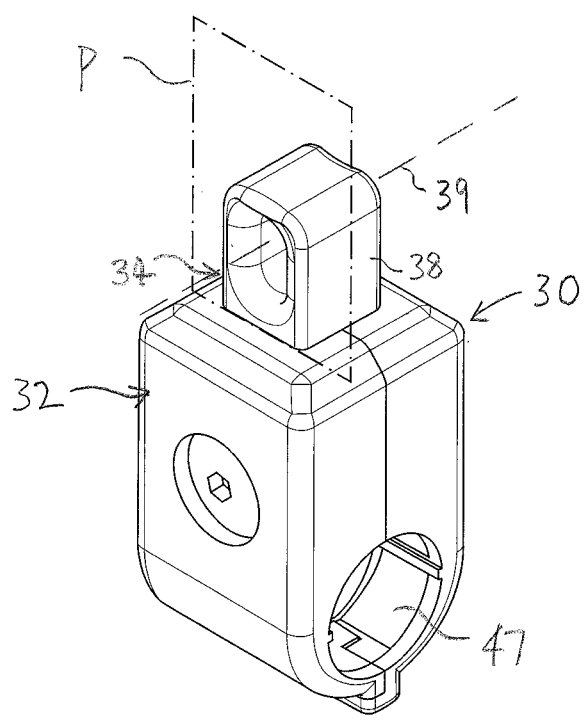
FIG. 2A is an isometric view of an embodiment of a bracket assembly of the invention.
Figure 2B:
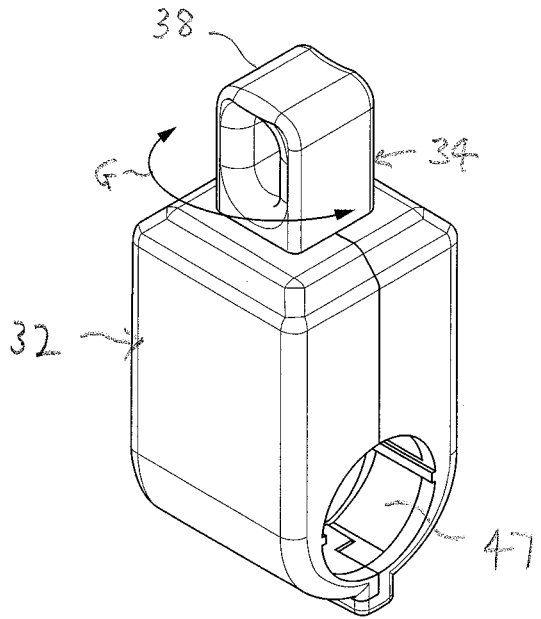
FIG. 2B is another isometric view of the bracket assembly of FIG. 2A.
Figure 2C:
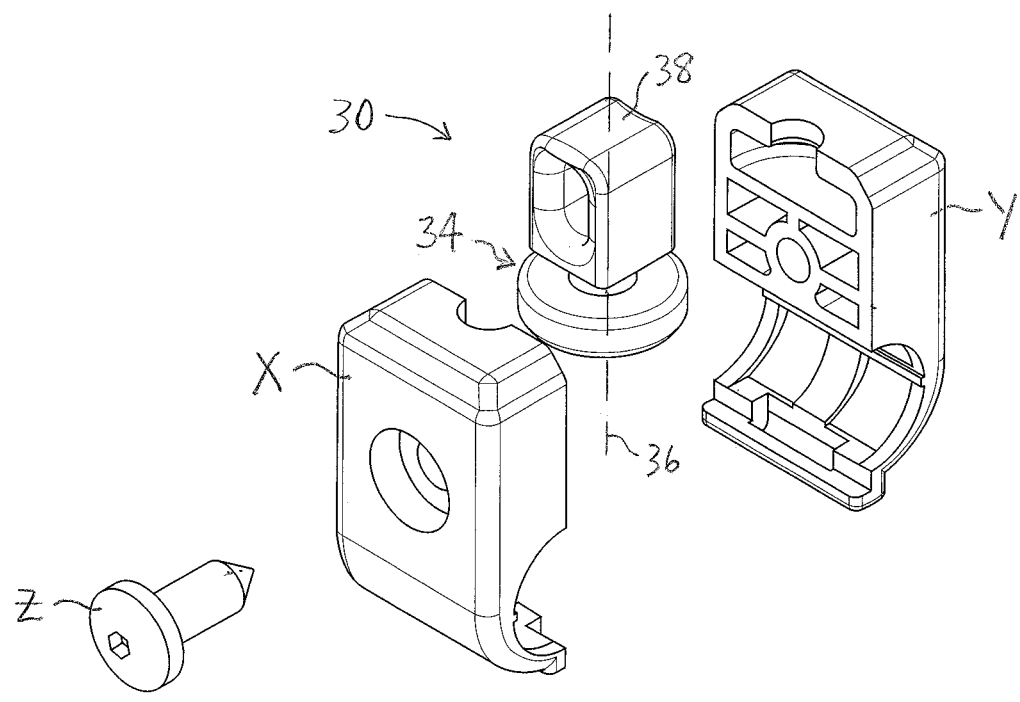
FIG. 2C is an exploded isometric view of the bracket assembly of FIGS. 2A and 2B.

In one embodiment, the system 20 preferably includes a number of bracket assemblies 30 (FIGS. 2A-2C). It is preferred that each bracket assembly 30 includes a body portion 32 that is securable to the delivery element 22, and an upper portion 34 (FIG. 2C) mounted to the body portion 32. As will also be described, the upper portion 34 preferably includes an aperture element 38 that defines an aperture 40 therein. The aperture element 38 defines an aperture axis 39 that is central to the aperture 40 (FIGS. 2A, 2B).

Figure 4A:
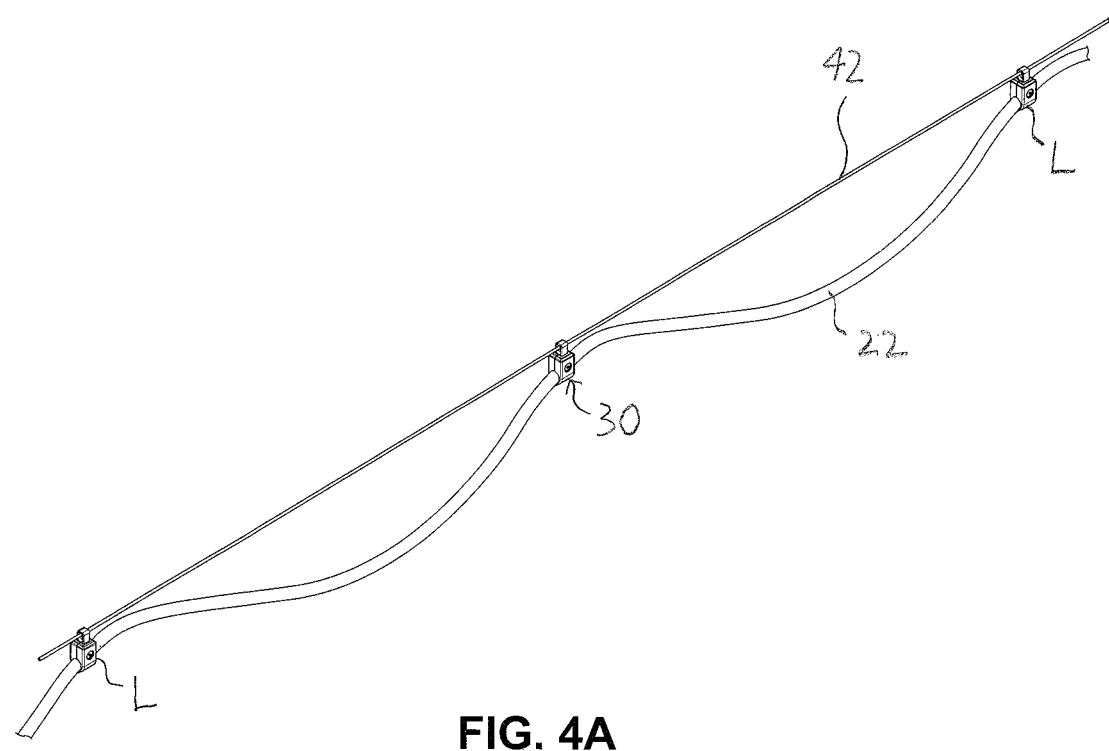
FIG. 4A is an isometric view of the cable in an extended condition supported by the line element, drawn at a smaller scale.

As will also be described, the body portions 32 of the respective bracket assemblies 30 preferably are secured to respective segments 41 of the delivery element 22 at locations "L" thereon spaced apart from each other along the delivery element 22 at preselected distances from each other (FIG. 4A). It is preferred that the locations "L" are substantially equally spaced apart from each other. Each body portion 32 preferably is secured to a respective segment 41 of the delivery element 22, at each respective location "L" thereof.

As can be seen in FIGS. 2A-2C, the body portion 32, when assembled (as shown in FIGS. 2A and 2B), defines an opening 47 therein, in which the segment 41 is positioned to which the body portion 32 is to be secured, when the body portion 32 is secured to the segment 41. As will be described, in one embodiment, the body portion 32 preferably is assembled to clamp onto the segment 41 at the preselected location "L" therefor.

In each bracket assembly 30, the segment 41 to which the body portion 32 is secured is held by the body portion 32 in a stationary position, relative to the body portion 32. Although the delivery element 22 may be bent or curved along its length between any two bracket assemblies 30, at each respective bracket assembly 30, the segment 41 to which the body portion 32 is secured is stationary relative to that bracket assembly 30.

The system 20 preferably also includes a line element 42 extending between an inner end 44 secured to the structure assembly 25, and an outer end 46 secured to the delivery assembly 21 proximal to the free end 28 (FIGS. 1D, 1E). Because the plug or connecting device 23 is also positioned at the free end 28 of the delivery element 22, movement of the plug 23 or connecting device relative to the structure assembly 25 (e.g., when the plug 23 is moved by a user, away from the structure assembly 25 or toward the structure assembly 25) causes corresponding movement of the outer end of the line element 42.

As can be seen in FIG. 1E, the line element 42 preferably includes an inner portion 43 that is at least partially engaged with the structure assembly 25 and an outer portion 45 that extends between the inner portion 43 and the outer end 46. As noted above, the delivery element 22 is omitted from FIG. 1E for clarity of illustration.

As will be described, in one embodiment, the outer portion 45 of the line element 42 preferably is subjected to tension. As a result, the outer portion 45 preferably is rectilinear, in a plan or top view, and defines a directional axis 37 along its length (in a plan or top view), between the outer end 46 and the inner portion 43.

Figure 1F:
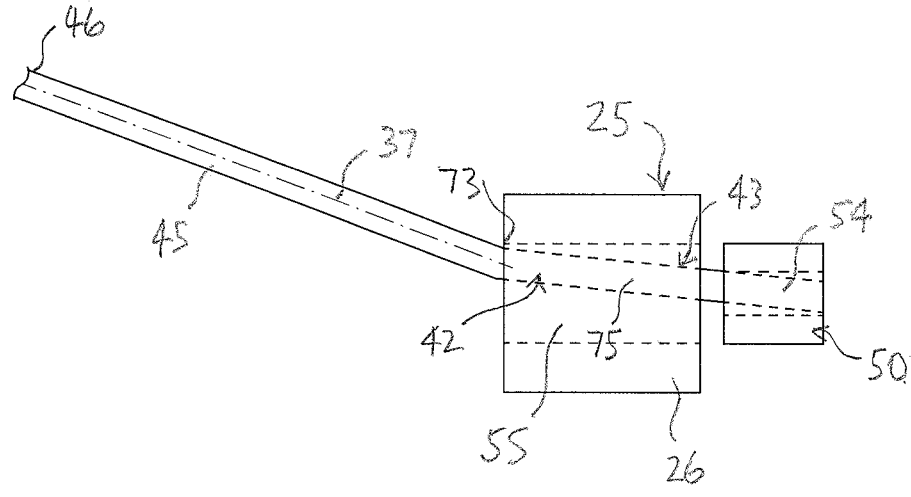
FIG. 1F is a schematic top view of the line element and the structure assembly in which an outer portion of the line element is nonaligned with the channel of the structure.
Figure 1G:
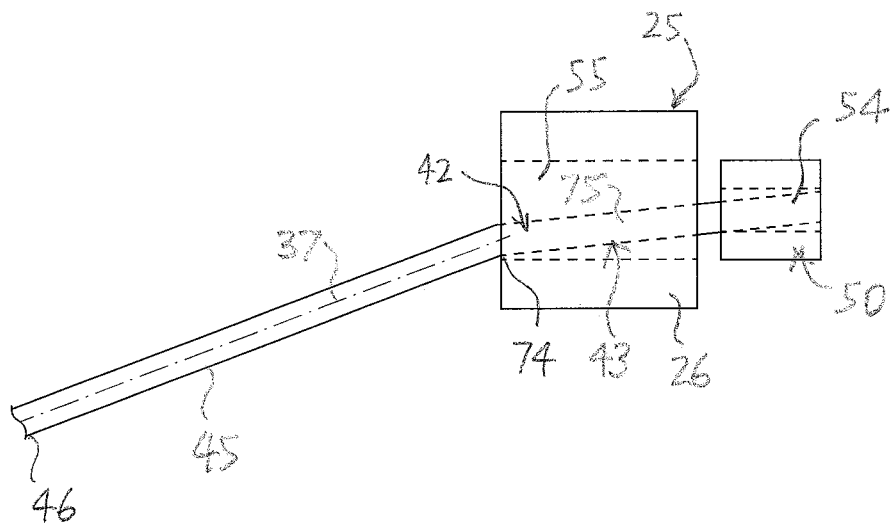
FIG. 1G is another schematic top view of the line element in which the outer portion of the line element is nonaligned with the channel of the structure.
Figure 1H:
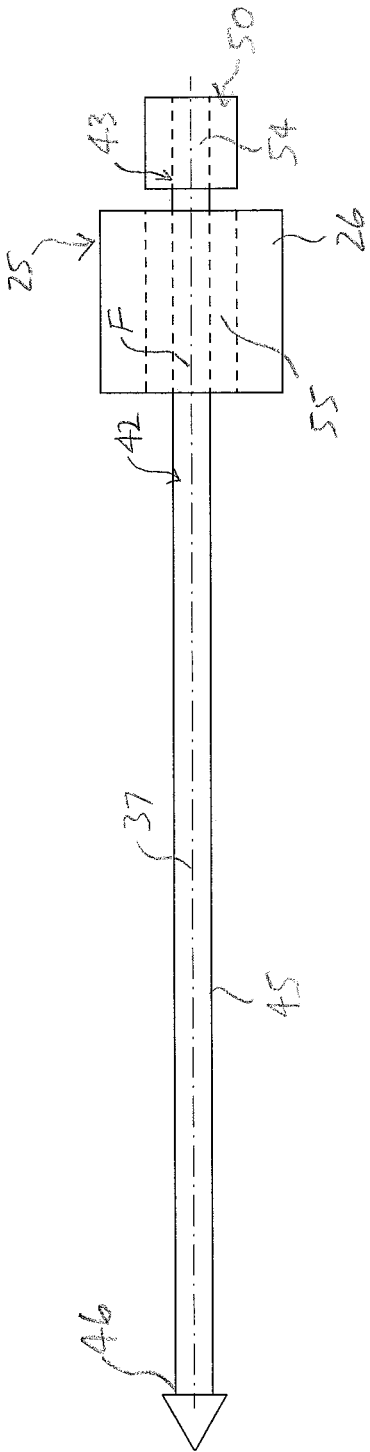
FIG. 1H is another schematic top view of the line element in which the line element is substantially aligned with the channel of the structure.
Figure 1I:
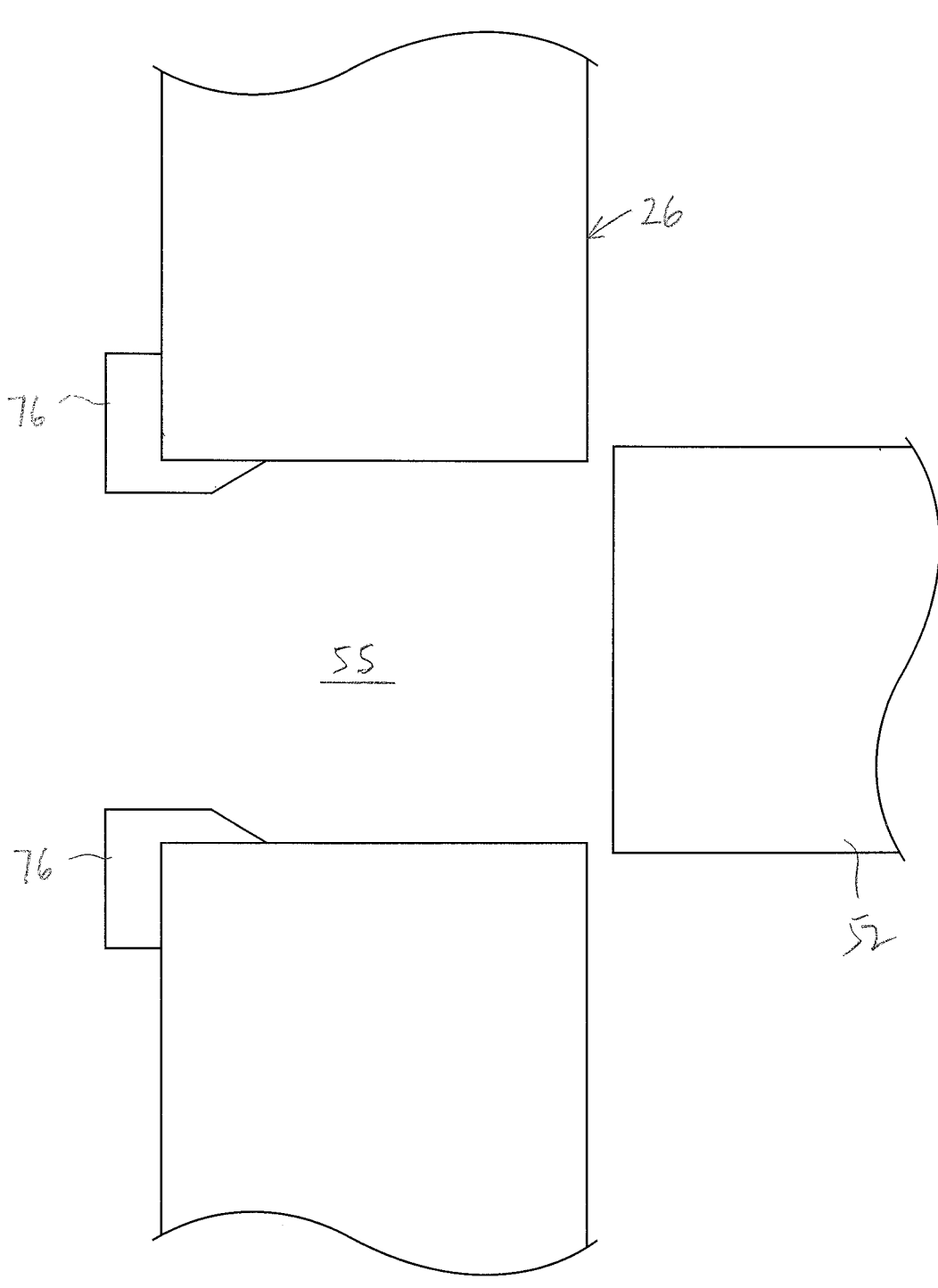
FIG. 1I is a cross-section of the structure assembly, drawn at a larger scale.
Figure 1J:
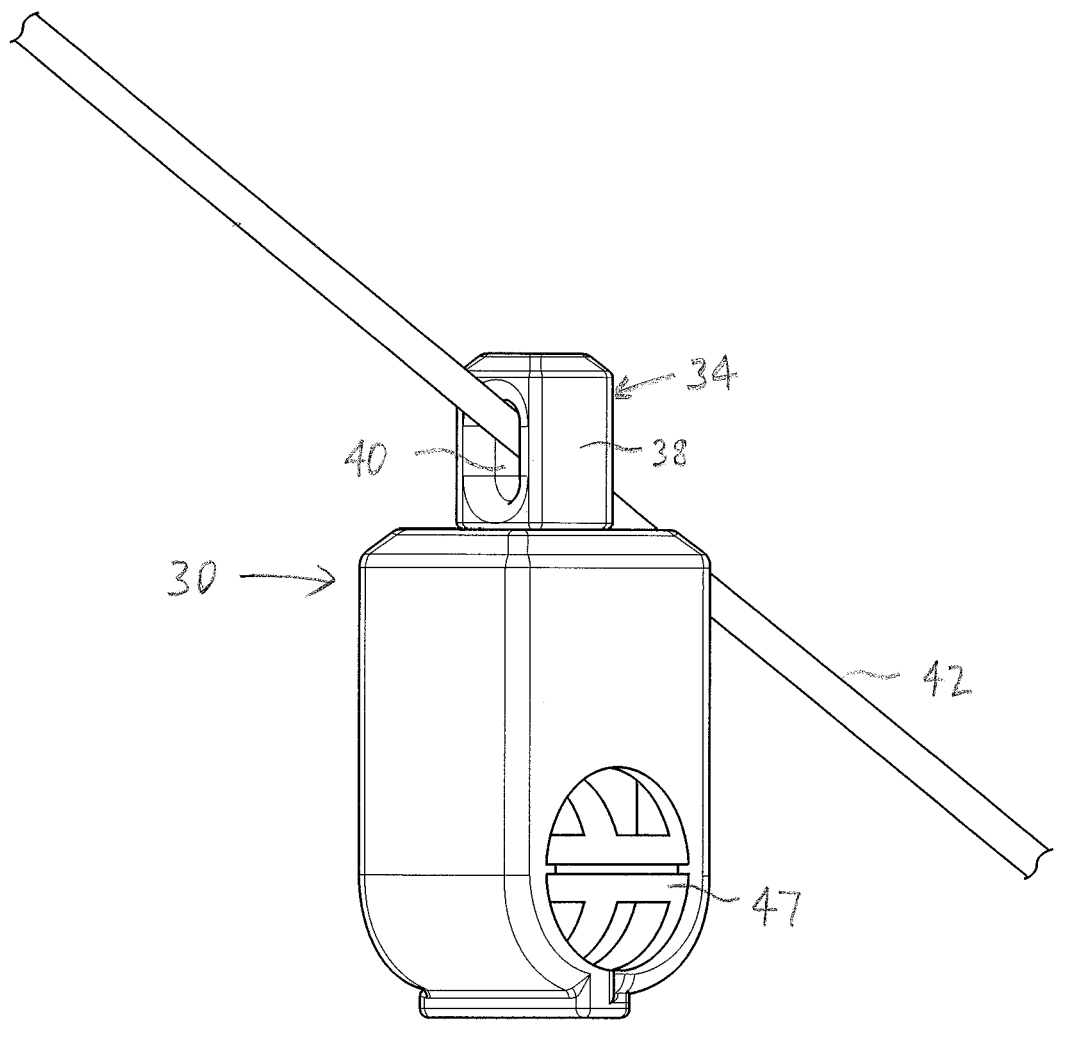
FIG. 1J is an isometric view of an embodiment of a bracket assembly of the invention with a portion of the line element partly positioned therein, drawn at a larger scale.
Figure 1K:
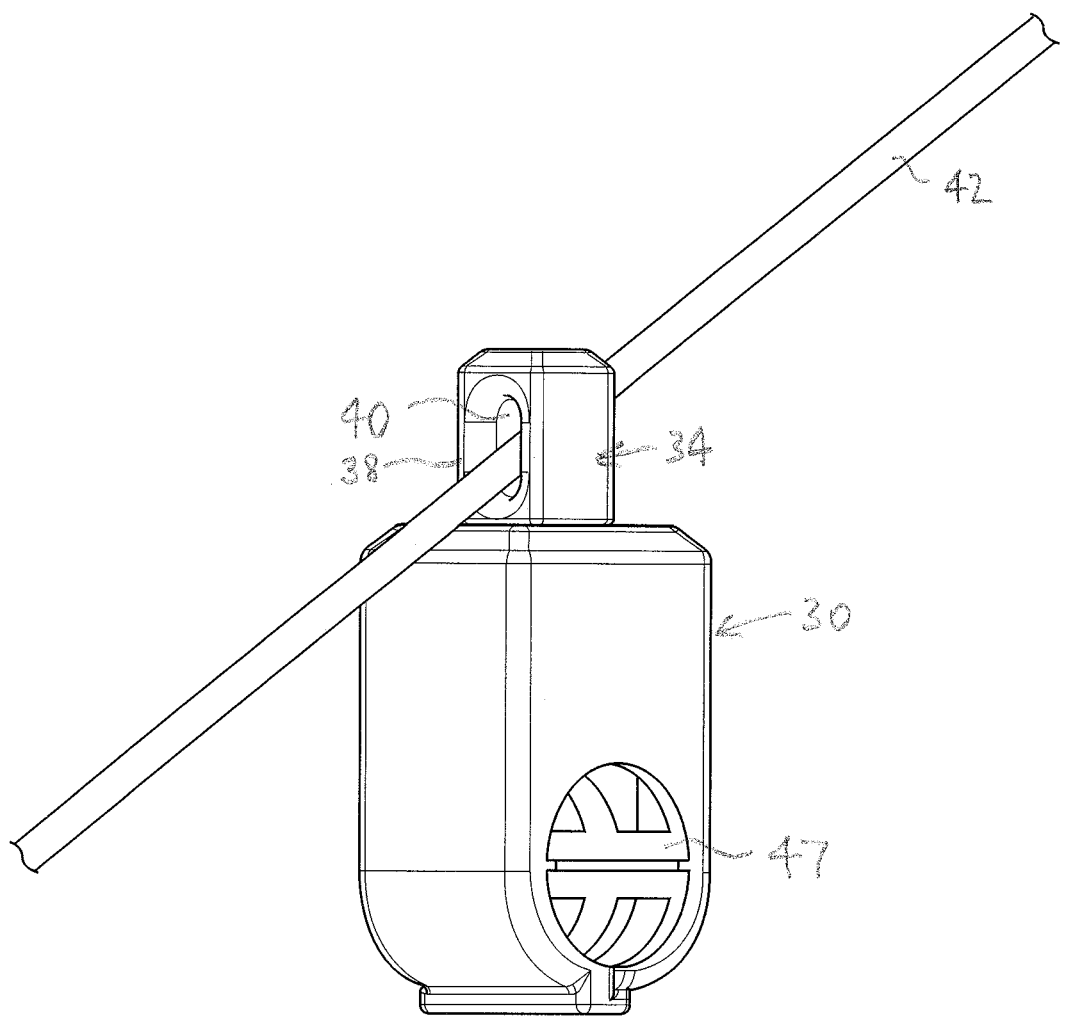
FIG. 1K is another isometric view of the bracket assembly and the portion of the line element of FIG. 1J.
Figure 1L:
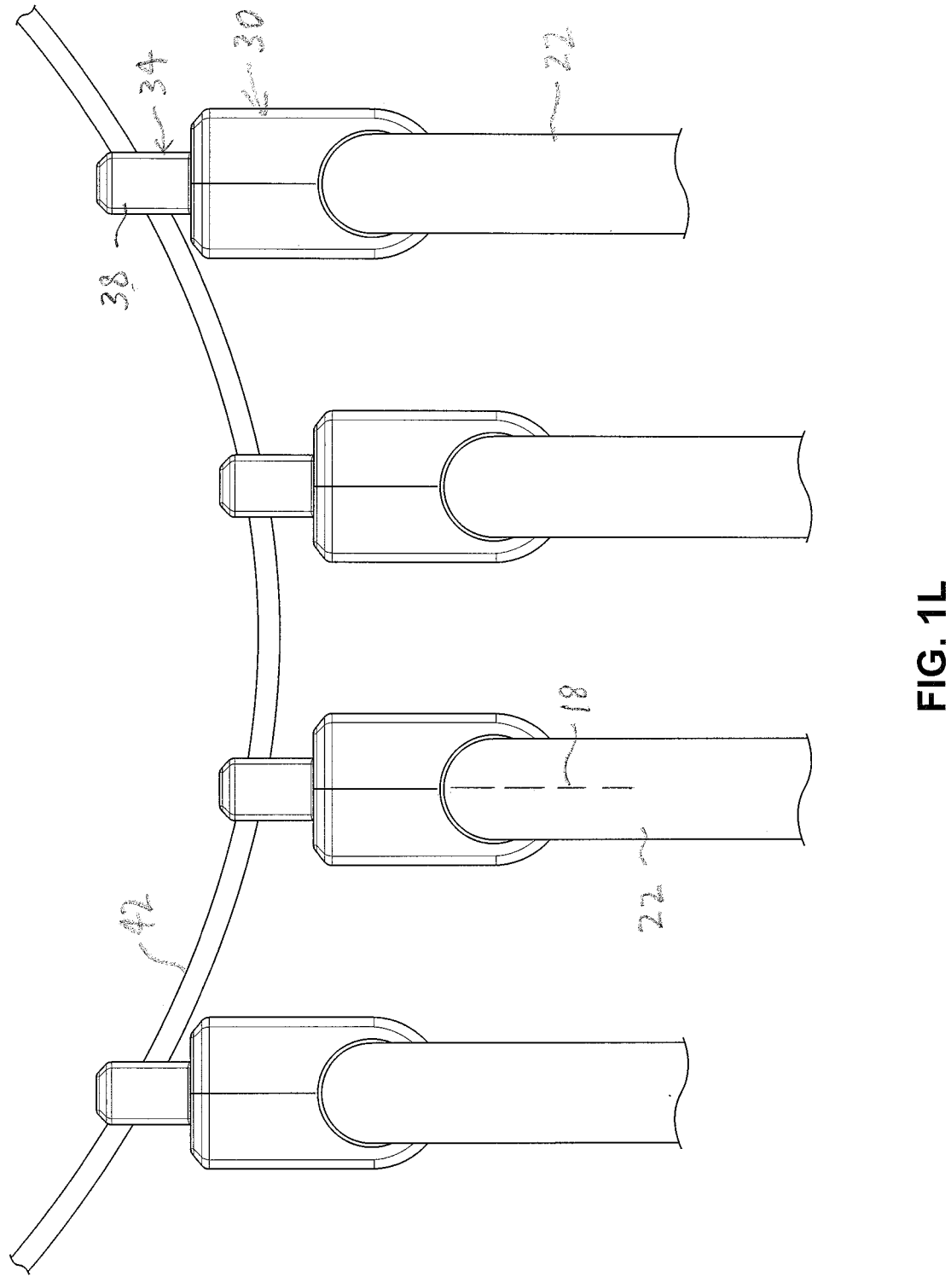
FIG. 1L is a side view showing the line element sagging while supporting the delivery element, drawn at a smaller scale.

As will be described, in practice, the delivery element 22 is sufficiently heavy that, when the delivery element 22 is in the extended condition, the delivery element 22 and the line element 42 are pulled downwardly due to gravity, and the line element 42 tends to sag between the structure assembly 25 and the free end 28 (FIG. 1L). Accordingly, although the line element 42 may be rectilinear (or substantially rectilinear) when the system is viewed from a location above the system when the delivery element 22 is not retracted, the line element 42 typically has a non-rectilinear profile when viewed from the side.

As will also be described, the line element 42 is movable relative to the delivery element 22 as the delivery element 22 is moved between the extended and retracted conditions thereof. Preferably, the line element 42 is slidingly receivable in the apertures 40 in the bracket assemblies 30 as the delivery element 22 is moved between the extended and retracted conditions thereof, and the outer portion 45 of the line element 42 is correspondingly moved relative to the delivery element 22 along the directional axis 37, to support the delivery element 22.

As will be described, because the line element 42 is slidingly receivable in the apertures 40 of the bracket assemblies 30 positioned along the delivery element 22, and the line element 42 tends to engage the aperture element 38, the orientation of the upper portion 34 relative to the line element 42 passing through the upper portion 34 changes as the delivery element 22 is moved between its retracted and extended conditions, to accommodate corresponding changes in the position of the line element 42 relative to the delivery element 22.

For example, in FIG. 4A, it can be seen that, when the delivery element 22 is in the extended condition thereof, the outer portion 45 of the line element 42 is in an elongate condition. Also, when the delivery element 22 is in the retracted condition, the outer portion 45 of the line element 42 is in a stored condition thereof (FIGS. 1A-1D). Movement of the outer portion 45 between the elongate and stored conditions thereof corresponds to, and is in response to, movement of the delivery element 22 between the extended and retracted conditions thereof.

As will also be described, in one embodiment, the outer portion 45 preferably is biased to the stored condition thereof.

Those skilled in the art would appreciate that the free end of the delivery element 22 may be located at an intermediate position, in which the delivery element 22 is in an intermediate condition (not shown), between the delivery element's extended and retracted conditions. When the delivery element 22 is in its intermediate condition, the outer portion 45 of the line element 42 is correspondingly shorter in length. The outer portion 45 defines the directional axis 37 when viewed in plan view in any event because, in one embodiment, the outer portion 45 of the line element 42 preferably is subjected to tension (FIG. 1H). (It will be understood that the delivery element 22 is omitted from FIG. 1H for clarity of illustration.)

From the foregoing, it can also be seen that the outer portion 45 of the line element 42 defines the directional axis 37 when viewed in plan view when the outer portion 45 is in any condition thereof, e.g., in the elongate and stored conditions.

In one embodiment, the upper portion 34 includes an aperture element 38 defining the aperture 40 and defining a plane "P" transverse to the aperture axis 39. Preferably, the aperture element 38 is positioned relative to the upper portion 34 so that the plane "P" is orthogonal to the aperture axis. When the delivery element 22 is in the retracted condition, the upper portions 34 are positioned with the respective planes "P" defined by the respective aperture elements 38 aligned (or substantially aligned) with the respective segments 41 of the delivery element 22 at the respective locations "L" on the delivery element 22 at which the body portions 32 are secured (FIG. 1D).

Figure 3A:
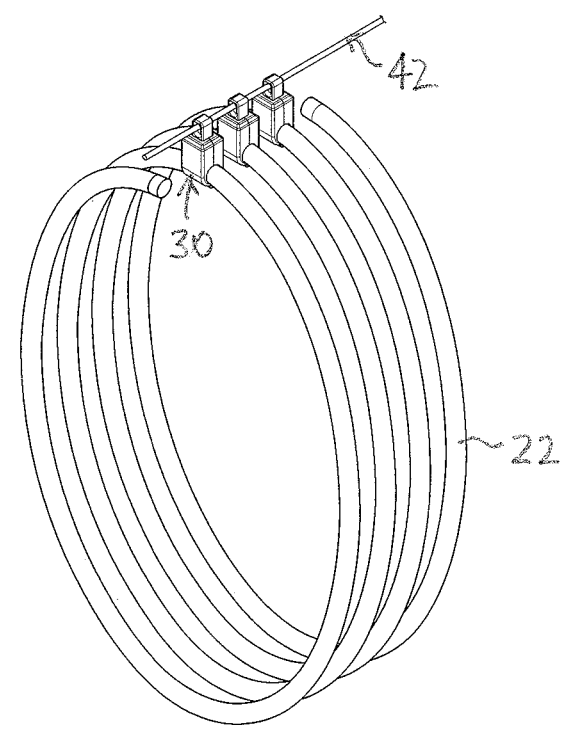
FIG. 3A is an isometric view of the cable in the retracted condition showing the line element of the system extending through upper portions of the bracket assemblies, drawn at a smaller scale.
Figure 3B:
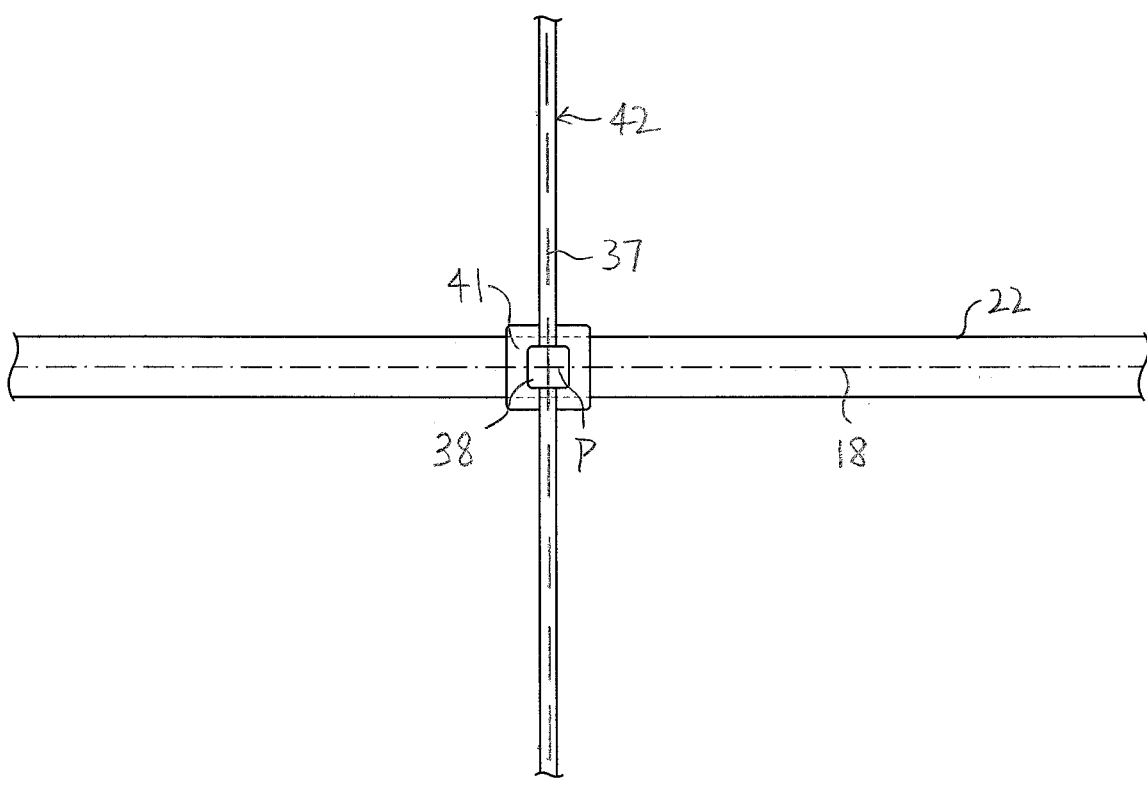
FIG. 3B is a top view of a portion of the cable and the line element of FIG. 3A, drawn at a larger scale.

As can be seen in FIGS. 1D and 3B, when the delivery element 22 is in its retracted condition, the aperture axes 39 defined by the aperture elements 38 preferably are aligned with each other, and also with the directional axis 37. The planes "P" are, in this situation, aligned with a delivery element center line 18 of each respective segment 41 to which the respective body portions 32 are secured.

When the delivery element 22 is in the extended condition, the upper portions 34 are positioned with the respective planes "P" defined by the respective aperture elements 38 positioned transverse to the segments 41 of the delivery element 22 at the respective locations "L" on the delivery element 22 at which the body portions 32 are secured.

When the delivery element 22 is moved from its retracted condition to the intermediate or extended conditions (i.e., by the user pulling the free end 28 outwardly, away from the structure assembly 25), the outer portion 45 of the line element 42 is subjected to corresponding motion, because the outer end 46 is secured to the free end 28 of the delivery element 22. While the free end 28 is moved away from the structure assembly 25, and as the outer portion 45 correspondingly moves through the respective apertures 40 of the bracket assemblies 30, the outer portion 45 at least occasionally engages the aperture elements 38, urging the aperture elements 38 from their aligned positions (i.e., the positions the aperture elements 38 are in when the delivery element 22 is in the retracted condition and the planes "P" are aligned with the delivery element centre lines 18) to generally transverse positions, in which the planes "P" of the aperture elements 38 are generally transverse to the delivery element center line 18.

In one embodiment, the upper portion 34 preferably is pivotable relative to the body portion 32 about an upper portion axis 36 defined by the upper portion 34, as indicated by arrow "G" in FIG. 2B. The upper portion 34 preferably is pivotable relative to the body portion 32. Preferably, the upper portion axis 36 is transverse to the aperture axis 39. In one embodiment, the aperture axis 39 preferably is orthogonal to the upper portion axis 36.

As noted above, and as illustrated in FIGS. 1J-1L, the line element 42 tends to sag, due to the weight of the delivery element 22. Also, depending on the position of the delivery element 22 relative to the line element 42 as the delivery element 22 is moved between its extended and retracted conditions, the position of the line element 42 in the aperture 40 varies. Because of the varying positions of the line element 42 relative to the upper portion 34 and relative to the aperture axis 39, in one embodiment, the aperture 40 preferably has a generally oval shape, with the major axis of the oval aligned with the upper portion axis 36.

Figure 4B:
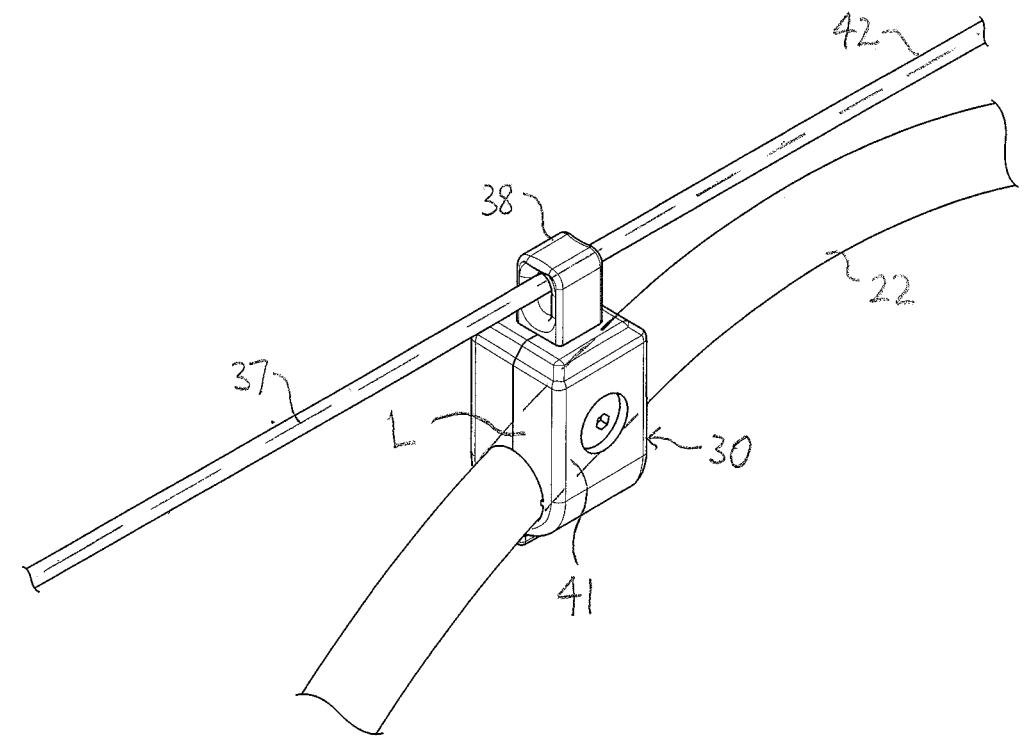
FIG. 4B is another isometric view of the cable and the line element of FIG. 4A, drawn at a larger scale.
Figure 4C:
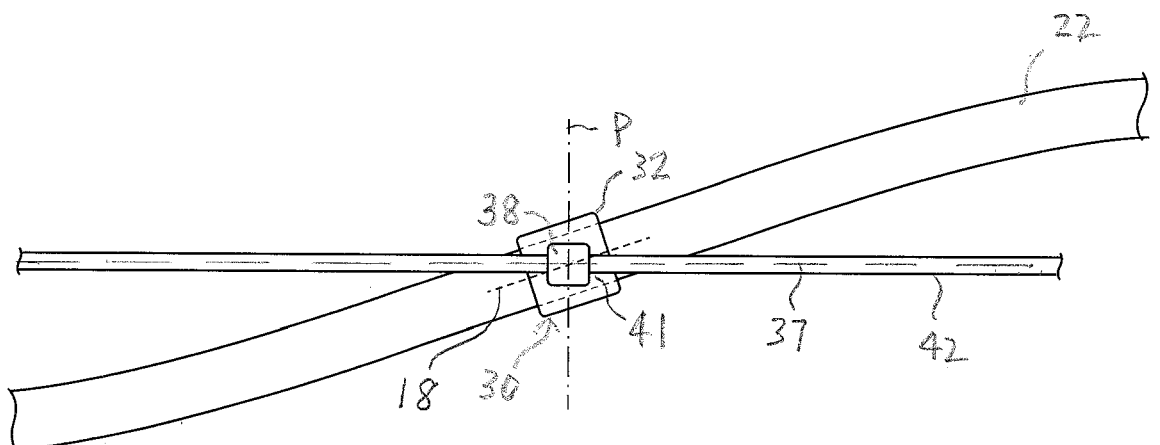
FIG. 4C is a top view of the cable and the line element of FIGS. 4A and 4B, drawn at a smaller scale.

In FIGS. 3B and 4C, the center line 18 of the delivery element 22 is shown. As can be seen in FIG. 3B, when the delivery element 22 is in the retracted condition, the plane "P" is aligned, or substantially aligned, with the center line 18 of the segment 41. (It will be understood that, for clarity, all of the portion of the delivery element 22 that is illustrated in FIG. 3B is aligned with the segment 41 shown in FIG. 3B.) Also, and as can be seen in FIG. 4C, when the delivery element 22 is in the extended condition, the upper portion 34 preferably is positioned so that the plane "P" is located transverse to the center line 18.

As noted above, when the delivery element 22 is moved between its retracted and extended conditions, the line element 42 is also moved, relative to the delivery element 22. Such corresponding movement of the line element 42 through the aperture element 38 causes the line element 42 to engage the aperture element 38, to urge the aperture element 38 to pivot about the upper portion axis 36 relative to the upper portion 34, to move the upper portion 34 generally toward alignment (or approximate alignment) with the line element 42.

As can be seen in FIGS. 3A-4C, the bracket assemblies 30 preferably are secured to the delivery element 22 at respective locations "L" thereon, and the line element 42 is positioned to extend through the aperture 40 in each bracket assembly's aperture element 38. When the delivery element 22 is in its extended condition, and also when the delivery element 22 is in the retracted condition, the delivery element 22 is supported by the line element 42 via the connecting bracket assemblies 30.

The bracket assembly 30 is shown unassembled in FIG. 2C, and is shown assembled in FIGS. 2A and 2B. As shown in FIG. 2C, in one embodiment, the body portion 32 preferably includes two mating portions "X" and "Y", formed to mate with each other. Preferably, the portions "X" and "Y" are mated with each other around a segment 41 at a selected location, to secure the body portion 32 to the segment 41 (not shown in FIGS. 2A-2C) in the opening or cavity 47 that is defined in the body portion 32, when the portion "X" and "Y" of the body 32 are mated together. It will be understood that, to assemble the bracket assembly 30, the upper portion 34 is located between portions "X" and "Y", and the portions "X" and "Y" are also fitted onto the selected segment 41 therefor. A fastener (e.g., a screw) "Z" is then inserted, to hold the mating portions "X" and "Y" to each other, and to secure the mating portions "X" and "Y" to the segment 41. When the bracket assembly 30 is assembled, the aperture element 38 may freely rotate about the upper portion axis 36.

As noted above, it will be understood that the delivery element 22 may be a cable, a hose, or any other relatively thick elongate member. Similarly, the line element 42 may be any relatively thin rope or braided wire or other suitable material that is flexible but sufficiently strong to support the cable.

Those skilled in the art would appreciate that the system 20 may include a delivery element 22 (e.g., a cable or a hose or conduit) that is connected to a structure assembly that is not an electrical charging station. For example, alternatively, the system 20 may be utilized at a gasoline or diesel pump (not shown), including a hose connected at a secured end thereof to the pump, or the system may include a pneumatic or hydraulic hose, e.g., for conveying air or water or other fluid therethrough. The delivery assembly 21 preferably includes a suitable plug, nozzle, or fitting 23 at the free end 28 for delivery. However, in certain circumstances, there may be no nozzle or fitting mounted at the free end, e.g., if the delivery assembly is a garden hose or an air hose. Or the nozzle or fitting may be provided at the free end of the delivery element, but may not be intended for engagement or connection with a recipient device.

As one example, in one embodiment, the structure 26 may be a charging station, e.g., for charging batteries of an electric vehicle. At the free end 28 of the delivery element 22, the plug 23 preferably is provided, for electrical connection with the vehicle inlet or receptacle 14 (FIG. 1E). It will be understood that the delivery element 22 is omitted from FIGS. 1E-1F, for clarity of illustration.

Those skilled in the art would appreciate that, in this example, the secured end 24 of the delivery element 22 is electrically connected to the charging station 26 so that when required, electric current may flow through the delivery element 22 to the plug 23 when electrically connected to the inlet 14, for charging the recipient device (e.g., batteries). When not in use, the plug 23 may be positioned in a holster 49 on the structure 26 (FIGS. 1A, 1B).

In one embodiment, the structure assembly 25 preferably includes the structure 26 and a reel 50 having a reel body 52 rotatable about a reel axis "R" thereof (FIG. 1D). The reel body 52 preferably is rotatably mounted to the structure 26. It will be understood that certain elements of the charging station or structure 26 are omitted from the drawings for clarity of illustration.

In one embodiment, the inner end 44 of the line element 42 preferably is secured to the reel body 52 (FIG. 1D). Those skilled in the art would appreciate that, depending on the extent to which the outer end 46 of the line element 42 is pulled outwardly from the structure assembly 25, an engaged part 54 of the line element 42 may remain wrapped onto the reel body 52 (FIG. 1D). As can be seen in FIG. 1D, the engaged part 54 of the line element 42 preferably is wound around the reel body 52 when the delivery element 22 is in the retracted condition. The outer end 46 of the line element 42 preferably is secured to the free end 28 of the delivery element 22, at a location 56 that is at, or proximal to, the plug 23 (FIGS. 1C, 1D).

As can be seen in FIGS. 1E-1I, the structure 26 preferably includes a channel 55 therein, through which the line element 42 is partially receivable. The channel 55 is defined by an axis "F". As can be seen in FIGS. 1C-1E, the structure 26 preferably includes an inner side 70 thereof, to which the reel 50 is attached, and an outer side 72, opposite to the inner side 70.

The delivery element 22 is shown in FIG. 1D in the retracted condition. In FIG. 1D, it can be seen that, to move the delivery element 22 from the retracted condition to the extended condition, the free end 28 is pulled in the direction generally indicated by arrow "A". This movement of the free end 28 causes the outer end 46 of the line element 42 also to move generally in the direction indicated by arrow "A", which in turn causes the inner portion 54 of the line element 42 to rotate the reel body 52 about the reel axis "R" in the direction indicated by arrow "B" (FIG. 1D). Because the line element 42 is biased to its stored condition, the line element 42 is pulled taut between the outer end 46 (i.e., attached to the free end 28 of the delivery element 22) and the inner end 44, which is secured to the reel body 52.

Accordingly, and as can also be seen in FIG. 1D, in one embodiment, when the delivery element 22 is moved from the retracted condition toward the extended condition thereof, the reel body 52 is rotated about the axis "R" in the direction indicated by arrow "B", to at least partially unwind the inner portion 54 from the reel body 52.

Those skilled in the art would appreciate that, when the delivery element 22 is moved from the extended condition or an intermediate condition toward the retracted condition, the line element 42 is moved in the direction indicated by arrow "C", and the reel body 52 is rotated about the axis "R" in the direction indicated by arrow "E" (FIG. 1D).

Upon movement of the delivery element 22 from the extended condition to the retracted condition, the reel body 52 is rotated about the axis "R" in the direction indicated by arrow "C" to wind the engaged part 54 of the line element 42 onto the reel body 52.

In one embodiment, the reel 50 preferably includes a biasing mechanism 57 that biases the reel body 52 to wind the part 54 of the line element 42 onto the reel body 52.

Because of the biasing mechanism 57, as the plug 23 is returned to the holster 49 (i.e., moving the delivery element 22 from the extended condition to the retracted condition), the line element 42 is partially retracted or pulled back by the biasing mechanism 57, to wind the engaged part 54 onto the reel body 52. As can be seen in FIGS. 1C and 1D, when the delivery element 22 is in the retracted condition and the plug 23 is in the holster 49, the bracket assemblies 30 are suspended from the line element 42, supporting the delivery element 22.

The biasing mechanism 57 may be any suitable means for biasing the reel body 52 to move the outer portion 45 of the line element 42 to its stored condition. For instance, the biasing mechanism 57 may include a suitable spring or weights, mounted to the reel body 52. Alternatively, a motor may be configured to control the movement of the outer portion 45 from its stored condition to its elongate condition, and vice versa.

As can be seen in FIGS. 1C, 3A, and 3B, with the delivery element 22 in the retracted condition and the plug 23 in the holster 49, the respective planes "P" of the arches 38 are substantially, or approximately, aligned with the center line 18 of each of the respective segments 41 to which each bracket assembly 30 is respectively attached. However, as can be seen in FIGS. 4A-4C, when the delivery element 22 is in the extended condition, the respective planes "P" of the arches 38 are positioned transverse to the segments 41 to which each bracket assembly 30 is respectively attached.

From the foregoing, it can be seen that, as the delivery element 22 is moved from the retracted condition to the extended condition, the position of the line element 42 relative to the respective segments 41 gradually shifts from a generally transverse relationship (FIGS. 1C, 1D) toward an approximately parallel relationship (FIGS. 4A-4C). In order to accommodate this shift in relative positions, in one embodiment, the respective upper portions 34 pivot about their respective axes 36.

Specifically, the upper portions 34 pivot from positions in which the planes "P" thereby defined are parallel (or approximately parallel) to the segments 41 to which the respective bracket assemblies 30 are secured, to positions in which the planes "P" thereof are transverse to the respective segments 41.

When the delivery element 22 is moved from the extended condition to the retracted condition, the position of the line element 42 relative to the respective cable segments generally shifts from a very approximately or roughly parallel relationship to a generally transverse relationship. As noted above, the pivoting movement of the upper portion 34 to accommodate the changing position of the outer portion 45 of the line element 42 relative to the delivery element 22 is due to intermittent engagement of the aperture element 38 by the outer portion 45 as it moves through the aperture 40.

It will be understood that the delivery element 22 may be utilized in situations where the delivery element 22 is not in its extended condition, but instead is utilized in a condition that is intermediate, i.e., between the fully extended and fully retracted conditions. In the intermediate condition, the free end 28 of the delivery element 22 is not pulled outwardly far enough to pull the delivery element 22 to its extended condition. Because the reel 50 is biased to wind the line element 42 onto the reel body 52, regardless of whether the delivery element 22 is in its extended, retracted, or intermediate conditions, in this embodiment, the outer portion 45 of the line element 42 is kept generally taut, sufficiently for defining the directional axis 37 in plan view.

Among other advantages, as the delivery element 22 is moved from the extended condition to the retracted condition, the delivery element 22 is smoothly gathered into a coil (FIGS. 1A, 1C, 1D, 3A). This occurs automatically, due to the outer portion 45 remaining taut as it follows the free end 28 back to the structure 26. When the delivery element 22 is fully or partly extended, upon the user moving the free end 28 toward the structure 26, the biasing mechanism 57 pulls on the line element 42, causing the bracket assembly 30 nearest to the structure to be drawn to the structure 26 first, with the other bracket assemblies 30 being drawn to the structure 26 respectively in order, according to the location of each bracket assembly on the delivery element 22 relative to the structure 26.

Also, and as can be seen in FIGS. 1A-1D, the system 20 does not require the delivery element's secured end 24 to be secured to the structure 26 at a relatively high elevation above ground level. The delivery element 22 is automatically coiled when the delivery element 22 is returned to the retracted condition at an elevation above ground level that is convenient.

As can be seen in FIGS. 1E-1H, the outer portion 45 of the line element 42 is the part of the line element 42 that defines the directional axis 37. For instance, in FIGS. 1E and 1H, the line element's outer portion 45 extends between the outer end 46 and the engaged part 54. In these circumstances, the inner portion 43 includes only the engaged part 54. In FIGS. 1E and 1H, the directional axis 37 is aligned, or substantially aligned, with the axis "F" of the channel 55.

However, in the examples illustrated in FIGS. 1F and 1G, the outer end 46 is positioned sufficiently out of alignment with the channel axis "F" that the line element 42 engages corners 73, 74 of the structure 26. In these examples, the part of the line element 42 that extends through the channel 55 and beyond, outwardly from the engaged part 54 on the reel body 52, does not define a single straight line.

In FIG. 1F, for example, the line element 42 is pulled outwardly in a direction that deviates from alignment with the channel axis "F" sufficiently that the line element engages the corner 73. Those skilled in the art would appreciate that this situation arises where the user has pulled the free end 28 of the delivery element 22 to a location relatively far out of alignment with the channel axis "F". A similar situation is illustrated in FIG. 1G, in which the line element 42 engages the corner 74.

In FIG. 1F, the outer portion 45 extends between the corner 73 and the outer end 46, and in FIG. 1G, the outer portion 45 extends between the corner 74 and the outer end 46. The outer portion 45 defines the directional axis 37. The outer portion 45 is rectilinear because the line element 42 is subjected to tension. In these examples, the inner portion 43 includes two parts, namely, an internal segment 75, and the engaged part 54 of the line element 42. The internal segment 75 extends between the engaged part 54 on the reel body 52 and the corner 73 in FIG. 1F, and the internal segment 75 extends between the engaged part 54 and the corner 74 in FIG. 1G. As can be seen in the examples illustrated in FIGS. 1F and 1G, the outer portion 45 defines the directional axis 37 as diverging from the channel axis "F".

As can be seen in FIG. 1I, in one embodiment, the structure 26 preferably includes a collar 76 that is formed for engagement by the line element 42 therewith, when the outer portion 45 diverges sufficiently from the channel axis "F" to cause the line element 42 to engage the collar 76. As can be seen in FIG. 1I, the collar 76 preferably covers the corners 73, 74 of the structure 26. Those skilled in the art would appreciate that the collar 76 may be suitably rounded or otherwise formed to minimize the wear to which the line element 42 is subjected as it engages the collar 76.

Figure 4D:
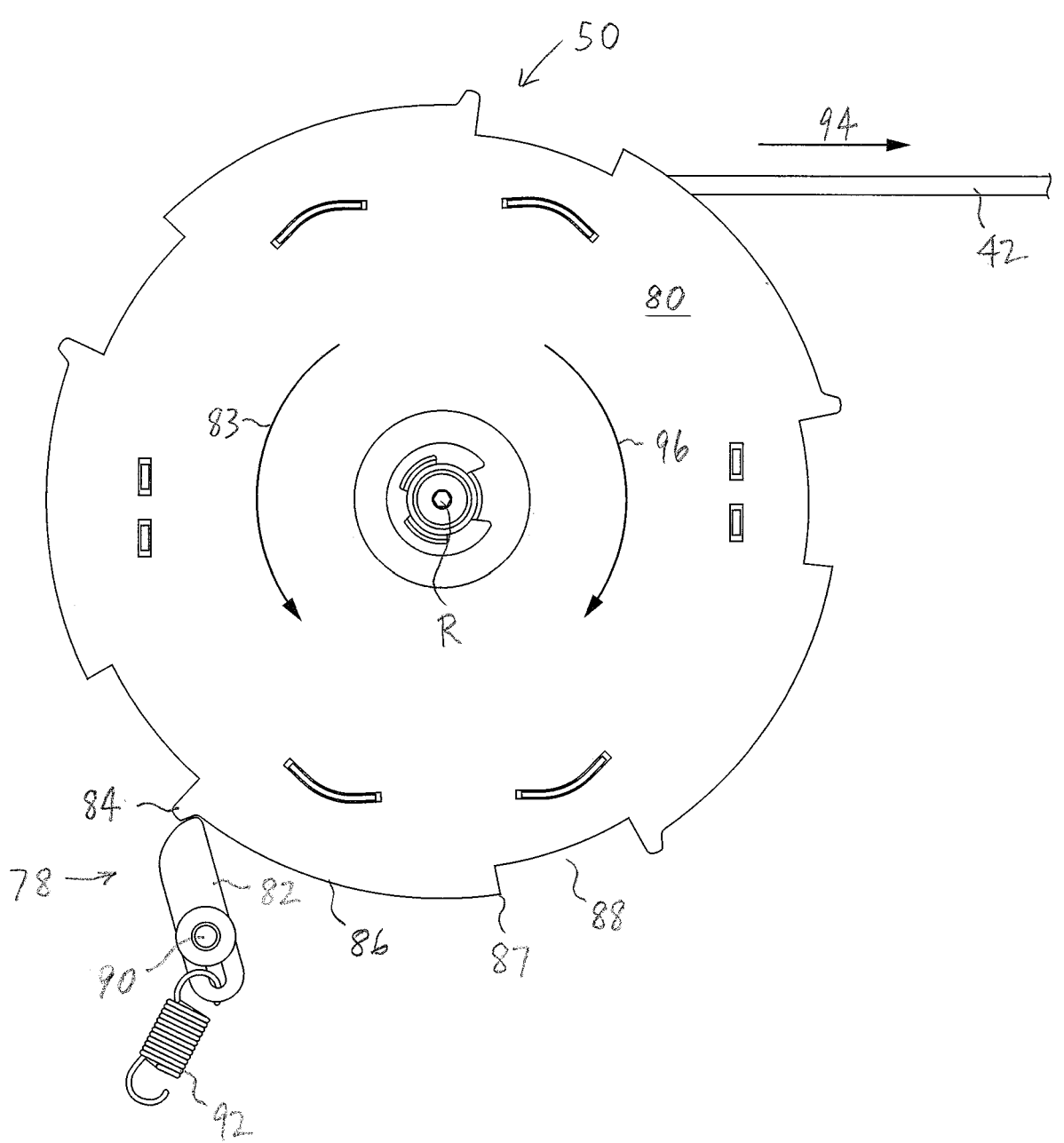
FIG. 4D is a side view of an embodiment of the reel of the system including a ratchet and pawl subassembly in which the pawl is in a lockable position, drawn at a larger scale.
Figure 4E:
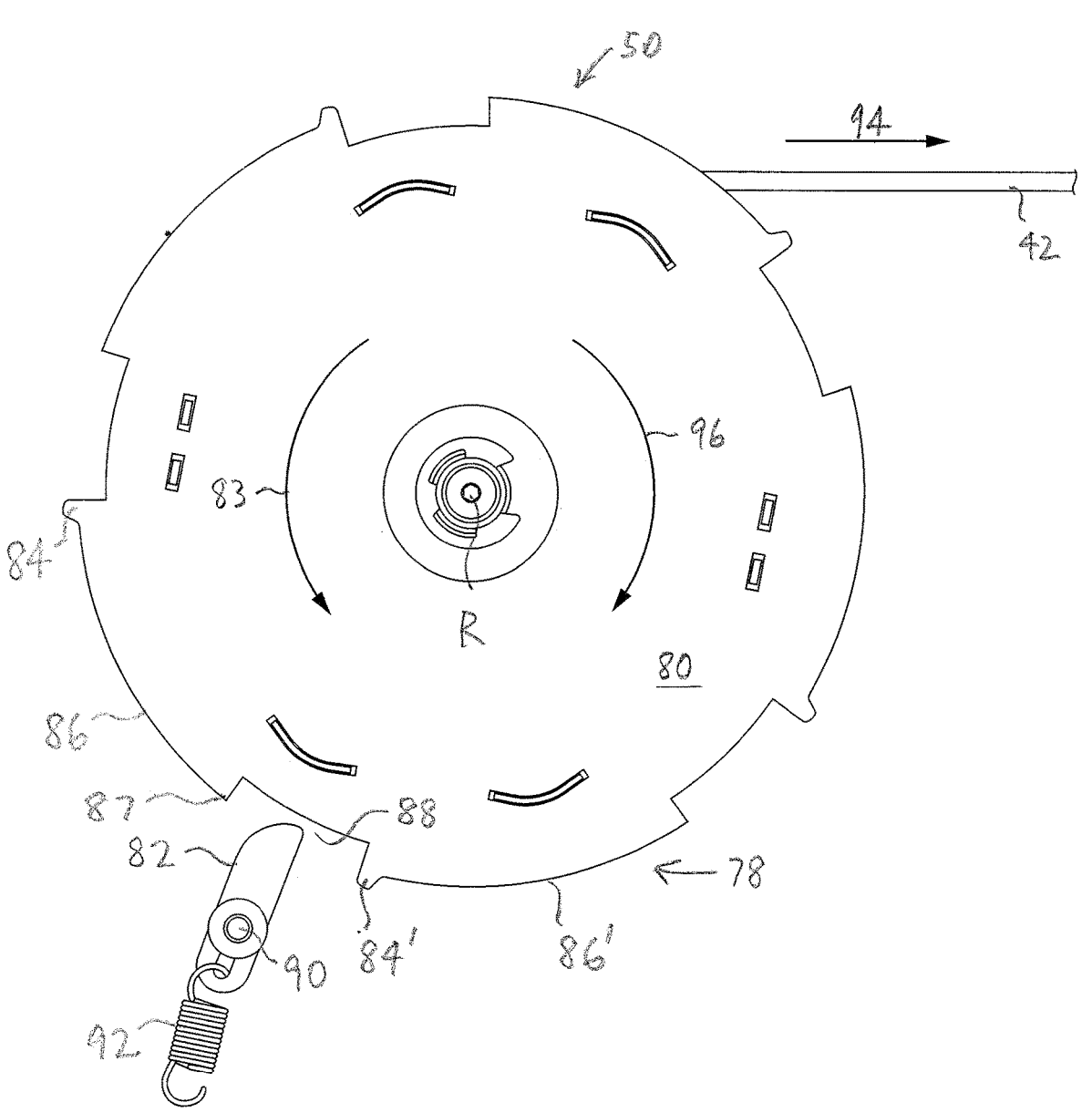
FIG. 4E is another side view of the reel of FIG. 4D in which the pawl is in a neutral position.
Figure 4F:
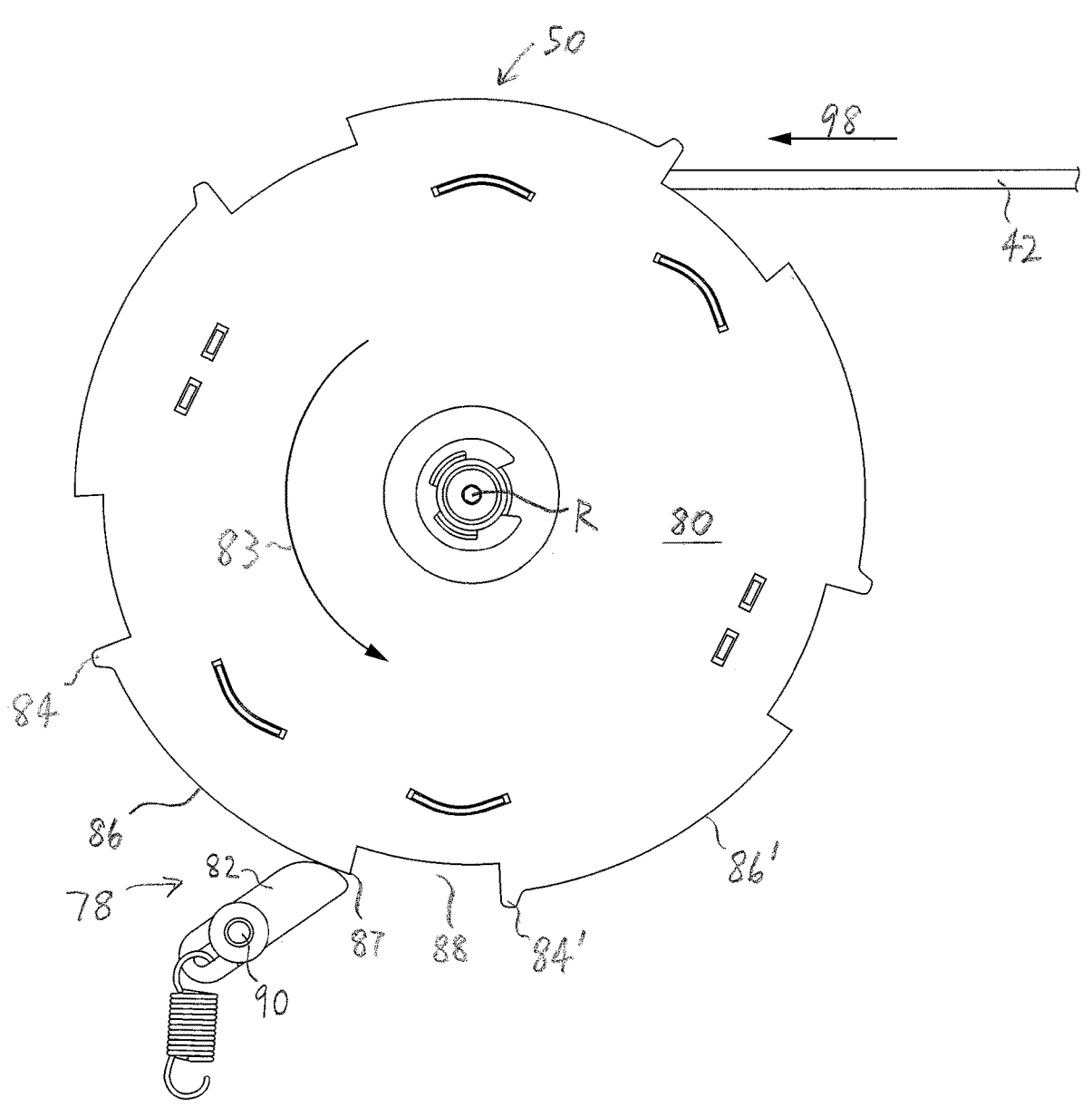
FIG. 4F is another side view of the reel of FIG. 4D in which the pawl is in an unlocked position.

In one embodiment, the reel 50 preferably includes a reel control subassembly 78 mounted to the reel body 52, for controlling rotation of the reel body 52 about the reel axis "R". As can be seen in FIGS. 4D-4F, the reel control subassembly 78 preferably includes a ratchet plate 80 coaxial with the reel body 52 and secured to the reel body 52, and a pawl 82 for engaging with the ratchet plate 80. The reel body 52 is not shown in FIGS. 4D-4F for clarity of illustration. Because the ratchet plate 80 is secured to the reel body 52 and coaxial with the reel body 52, the ratchet plate 80 and the reel body 52 rotate in unison.

It will be understood that the biasing mechanism (not shown in FIGS. 4D-4F) urges the ratchet plate 80 to rotate in a counter-clockwise direction, as illustrated. The direction in which the ratchet plate 80 is urged to rotate by the biasing mechanism is indicated by arrow 83.

As can be seen in FIG. 4D, the ratchet plate 80 includes a number of toes (or ridges) 84, plateaus 86, and valleys 88 positioned in a repeating pattern around the perimeter of the ratchet plate 80.

Preferably, the pawl 82 is pivotable about a pivot pin 90, and biased by a spring 92 attached thereto to a neutral position, which is shown in FIG. 4E. The spring 92 is attached at one end thereof to the pawl 82, and it will be understood that the spring 92 is attached at its other end to a stationary element (not shown in FIGS. 4D-4F), so that the spring urges the pawl 82 to the neutral position. As will be described, the pawl 92 is pivotable about the pivot pin 90 between a lockable position (FIG. 4D) and an unlocked position (FIG. 4F). The neutral position (FIG. 4E) is between the lockable and unlocked positions.

As can be seen in FIG. 4D, when the pawl 82 is in the lockable position, the pawl 82 may become lodged against one of the toes 84, and in these circumstances the pawl 82 prevents rotation of the ratchet plate 80 (and the reel body 52) in the direction indicated by arrow 83. When the pawl 82 is in its lockable position and engaged with the toe 84 (as shown in FIG. 4D), rewinding of the line element 42 onto the reel body that might otherwise occur (i.e., due to the biasing mechanism) does not take place, due to the engagement of the pawl 82 in the lockable position with the toe 84.

When the line element 42 is pulled in the direction indicated by arrow 94, the reel body and the ratchet plate 80 rotate clockwise, i.e., in the direction indicated by arrow 96 (FIG. 4D). Due to the clockwise rotation, the plateau 86 is moved past the pawl 82 until the plateau 86 ends at a point identified by reference character 87 in FIG. 4D, and the valley 88 is then positioned at the pawl 82. At that point, as shown in FIG. 4E, the pawl 82 pivots to its neutral position, due to the spring 92 urging the pawl 82 to that position.

Those skilled in the art would appreciate that, with continued rotation of the ratchet plate 80 in the clockwise direction, the pawl 82 will simply ride over the next toe (identified by reference character 84' in FIG. 4E) and the next plateau (identified by reference character 86'), without impeding the clockwise rotation of the ratchet plate 80. It will also be understood that, when the ratchet plate 80 rotates in the clockwise direction to cause the pawl 82 to engage the toe 84', the toe 84' returns the pawl 82 to the lockable condition.

Accordingly, once the pawl 82 engages the plateau 86', if the tension on the line element 42 is relaxed to the extent that the biasing mechanism can rotate the ratchet plate 80 in the counter-clockwise direction, then the ratchet plate 80 may rotate counter-clockwise until the pawl 82, in its lockable position, engages the toe 84'. This means that, if the user ceases pulling on the delivery element 22 (and the tension on the line element 42 ceases as a result), the ratchet plate 80 will be allowed to rotate only a small amount before such rotation stops, when the pawl 82 engages the toe 84'.

In this way, the reel control subassembly 78 does not impede the movement of the line element 42 as it is pulled off the reel body toward the elongate condition, i.e., when the free end 28 of the delivery element 22 is pulled away from the structure 26. But the reel control subassembly 78 also prevents uncontrolled rewinding of much of the entire line element 42, for example, if the user chooses to stop pulling on the delivery element 22, when deploying the delivery element 22. If the user stops pulling on the delivery element 22, the ratchet plate 80 rotates in the counter-clockwise direction until the pawl 82 (which is in its lockable position) engages the first toe moved against it.

The manner in which the reel control subassembly 78 functions when the delivery element 22 is to be returned to its retracted condition will now be described. Referring again to FIG. 4E, it can be seen that, if the pawl 82 is in its neutral condition and the ratchet plate 80 then commences rotation in the counter-clockwise direction (as indicated by arrow 83), the pawl 82 is first engaged by the plateau 86 at the point 87, which puts the pawl 82 into its unlocked position (FIG. 4F). It will be understood that the rotation of the ratchet plate 80 in the counter-clockwise direction may occur if the free end 28 of the delivery element 22 is moved toward the structure 26, e.g., to return the delivery element 22 to its retracted condition.

As can be seen in FIG. 4F, while the pawl 82 is in the unlocked position, it does not impede or oppose counter-clockwise rotation of the ratchet plate 80. While the pawl 82 is in its unlocked position, it simply rides over every toe it engages. In FIG. 4F, the line element 42 is shown being allowed to wind onto the reel body 52, due to the biasing mechanism (not shown) causing the ratchet plate 80 and the reel body to rotate counter-clockwise, pulling the line element 42 toward its stored condition, as indicated by arrow 98.

Those skilled in the art would also appreciate that additional alternative embodiments of the bracket assembly, and of the upper portion thereof, may be feasible. An alternative embodiment is illustrated in FIGS. 5A and 5B.

Figure 5A:
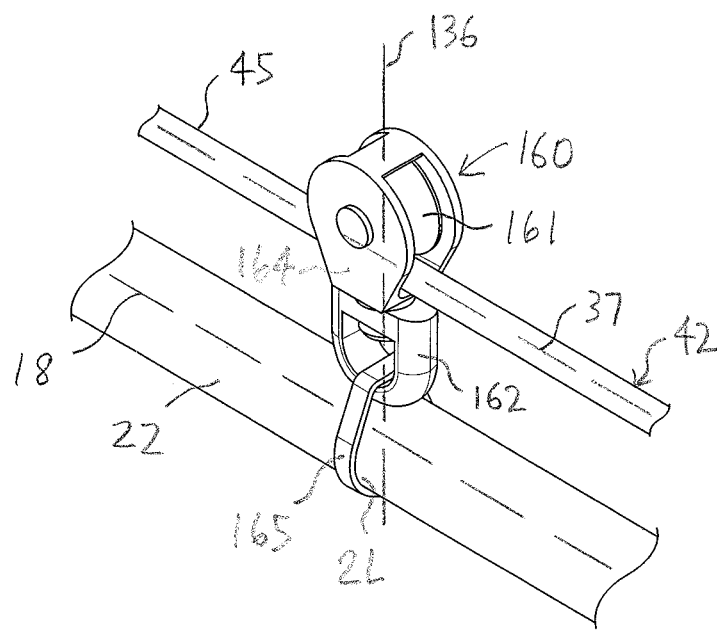
FIG. 5A is an isometric view of a portion of an alternative embodiment of the system in which the cable and the line element are connected by a pulley, drawn at a smaller scale.
Figure 5B:
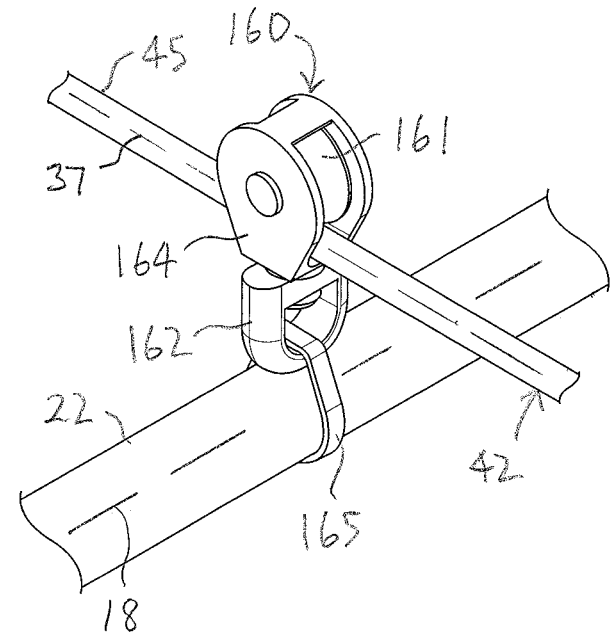
FIG. 5B is an isometric view of the portion of another alternative embodiment of the system of the invention.

As can be seen in FIGS. 5A and 5B, a pulley 160 including a pulley wheel 161 may be secured to the delivery element 22 at a location "2L", and the line element 42 may be drawn over the pulley wheel 161. Preferably, the pulley 160 includes a bracket 162 and a body 164 that are pivotably connected, permitting the body 164 to rotate about an axis 136 (FIG. 5A). The pulley wheel 161 is rotatably mounted in the body 164. Preferably, the bracket 162 is secured to the delivery element 22 by any suitable means, e.g., a strap or clamp 165.

It will be understood that a number of pulleys 160 may be secured to the delivery element 22 at a number of locations "2L" thereon that are spaced apart from each other along the delivery element 22. Only one pulley 160 is illustrated in FIGS. 5A and 5B in order to simplify the illustrations. In FIG. 5A, the delivery element 22 is shown in a fully extended condition, and in FIG. 5B, the delivery element 22 is shown in a fully retracted condition.

When the delivery element 22 is in the retracted condition (FIG. 5B), the outer portion 45 of the line element 42 is located transverse to the segment 41. In FIG. 5B, because the line element 42 is drawn over the pulley wheel 161, the line element 42 has located the pulley wheel 161 so that it is also transverse, and orthogonal or substantially orthogonal to the segment 41. In this situation, the directional axis 37 is located transverse to the center line 18.

When the delivery element 22 is in the extended condition (FIG. 5A), the pulley wheel 161 is aligned or almost aligned with the outer portion 45 of the line element 42. The directional axis 37 is aligned, or almost aligned, with the center line 18 of the delivery element 22 (as illustrated in FIG. 5A), and the pulley wheel 161 may also be aligned, or almost aligned, with the delivery element 22.

It will be appreciated by those skilled in the art that the invention can take many forms, and that such forms are within the scope of the invention as claimed. The scope of the claims should not be limited by the preferred embodiments set forth in the examples, but should be given the broadest interpretation consistent with the description as a whole.

We claim:

1. A system for conducting electrical energy from a source thereof to a recipient device having an inlet thereon, the system comprising:

a structure assembly via which the electrical energy is accessible from the source;

a delivery assembly for conducting the electrical energy from the structure assembly to the recipient device, the delivery assembly comprising a delivery element and a plug, the delivery element extending between a free end thereof at which the plug is located for electrical connection with the inlet at the recipient device and a secured end thereof attached to the structure assembly, the delivery element being movable between an extended condition, in which the free end is located distal to the structure assembly, and a retracted condition, in which the free end is located proximal to the structure assembly;

a plurality of bracket assemblies, each said bracket assembly comprising:

a body portion securable to the delivery element;

an upper portion mounted to the body portion, the upper portion defining an aperture therein defined by an aperture axis;

the body portions of the bracket assemblies being secured to respective segments of the delivery element at locations thereon spaced apart from each other along the delivery element at preselected distances;

a line element extending between an inner end secured to the structure assembly and an outer end secured to the delivery assembly proximal to the free end, the line element comprising an inner portion at least partially engaged with the structure assembly and an outer portion extending between the inner portion and the outer end;

the line element being movable relative to the delivery element as the delivery element is moved between the extended and retracted conditions thereof; and the line element being slidingly receivable in the apertures in the upper portions as the delivery element is moved between the extended and retracted conditions thereof, and the outer portion of the line element is correspondingly moved relative to the delivery element, to support the delivery element.

2. The system according to claim 1 in which:

when the delivery element is in the extended condition thereof, the outer portion of the line element is in an elongate condition thereof;

when the delivery element is in the retracted condition thereof, the outer portion of the line element is in a stored condition thereof; and movement of the outer portion of the line element between the elongate condition and the stored condition corresponds to movement of the delivery element between the extended condition and the retracted condition.

3. The system according to claim 2 in which the outer portion of the line element is biased to the stored condition thereof.

4. The system according to claim 3 in which the outer portion of the line element defines a directional axis when the outer portion of the line element is in the elongate condition.

5. The system according to claim 4 in which the outer portion of the line element defines the directional axis when the outer portion of the line element is in the stored condition.

6. The system according to claim 5 in which the structure assembly comprises:

a structure;

a reel comprising a reel body rotatable about a reel axis thereof, the reel body being rotatably mounted to the structure;

the inner end of the line element being secured to the reel body, and an engaged part of the line element being wound around the reel body when the delivery element is in the retracted condition;

the structure comprising a channel therein through which the line element is partially receivable, the channel being defined by a channel axis;

when the delivery element is moved from the retracted condition toward the extended condition, the reel body is rotated to at least partially unwind the engaged part from the reel body; and upon movement of the delivery element from the extended condition toward the retracted condition, the reel body is rotated to at least partially wind the engaged part of the line element onto the reel body.

7. The system according to claim 6 in which the reel comprises a biasing mechanism that biases the reel body to wind the engaged part of the line element onto the reel body.

8. The system according to claim 7 in which:

the structure comprises an inner side, to which the reel body is attached, and an oppositely positioned outer side; and the structure comprises a collar at least partially around the channel at the outer side, the collar being formed for engagement therewith by the line element when the outer portion of the line element diverges sufficiently from the channel axis to cause the line element to engage the collar.

9. The system according to claim 3 in which:

the upper portion comprises an aperture element defining the aperture and defining a plane transverse to the aperture axis; and when the delivery element is in the retracted condition thereof, the upper portions are positioned with the respective planes defined by the respective aperture elements aligned with the respective segments of the delivery element at the locations at which the body portions are secured, and when the delivery element is in the extended condition thereof, the upper portions are positioned with the respective planes defined by the respective aperture elements positioned transverse to the respective segments of the delivery element at the respective locations at which the body portions are secured.

10. The system according to claim 1 in which the upper portion is pivotable relative to the body portion about a upper portion axis defined by the upper portion, the upper portion axis being transverse to the aperture axis.

11. A bracket assembly for connecting a delivery element with a line element supporting the delivery element as the delivery element is moved between an extended condition and a retracted condition thereof, the delivery element extending between a secured end thereof attached to a structure assembly and a free end thereof, the line element extending between an inner end secured to the structure assembly and an outer end thereof secured to the delivery element proximal to the free end, the line element including an inner portion at least partially engaged with the structure assembly and an outer portion extending between the inner portion and the outer end, the bracket assembly comprising:

a body portion defining a delivery element opening therein that is defined by a body portion axis, a segment of the delivery element being securable in the delivery element opening, in which the segment is aligned with the body portion axis;

an upper portion pivotably mounted to the body portion, the upper portion comprising an aperture element pivotable about an upper portion axis that is transverse to the body portion axis; and the aperture element defining an aperture opening therein defined by an aperture axis transverse to the upper portion axis, in which the line element is slidingly receivable, wherein the line element is engageable with the aperture element as the delivery element is moved between the extended and retracted conditions and the outer portion of the line element correspondingly moves through the aperture opening, to urge the aperture element toward alignment with the line element.

12. A method of supporting a delivery element that is movable between an extended condition, in which a free end of the delivery element is located distal to a structure assembly to which a secured end of the delivery element is secured, and a retracted condition, in which the free end is located proximal to the structure assembly, the method comprising:

(a) providing a line element extending between an inner end thereof secured to the structure assembly and an outer end thereof secured to the delivery element proximal to the free end, the line element comprising an inner portion engaged with the structure assembly and an outer portion extending between the inner portion and the outer end;

(b) providing a plurality of bracket assemblies, each said bracket assembly comprising:

a body portion securable to a segment of the delivery element wherein, when the body portion is secured to the delivery element segment, the delivery element segment is aligned with a body portion axis;

an upper portion pivotably mounted to the body portion, the upper portion comprising an aperture element pivotable about an upper portion axis that is transverse to the body portion axis;

the aperture element defining an aperture therein, the aperture being defined by an aperture axis that is transverse to the upper portion axis;

(c) positioning the line element in the apertures; and (d) when the delivery element moves between the extended condition and the retracted condition, allowing the line element to move through the apertures relative to the delivery element, wherein the aperture element is urged by the outer portion of the line element toward alignment of the upper portion axes with the respective segments of the delivery element.

13. A system comprising:

a structure assembly;

a delivery element extending between a free end thereof positionable distal from the structure assembly and a secured end thereof attached to the structure assembly, the delivery element being movable between an extended condition, in which the free end is located distal to the structure assembly, and a retracted condition, in which the free end is located proximal to the structure assembly;

a plurality of bracket assemblies, each said bracket assembly comprising:

a body portion securable to the delivery element;

an upper portion mounted to the body portion, the upper portion defining an aperture therein;

the body portions of the bracket assemblies being secured to respective segments of the delivery element at locations thereon spaced apart from each other along the delivery element at preselected distances;

a line element extending between an inner end secured to the structure assembly and an outer end secured to the delivery element proximal to the free end, the line element comprising an inner portion at least partially engaged with the structure assembly and an outer portion extending between the inner portion and the outer end;

the line element being movable relative to the delivery element as the delivery element is moved between the extended and retracted conditions thereof; and the line element being slidingly receivable in the apertures in the upper portions as the delivery element is moved between the extended and retracted conditions thereof, and the outer portion of the line element is correspondingly moved relative to the delivery element, to support the delivery element.

14. The system according to claim 13 in which:

when the delivery element is in the extended condition thereof, the outer portion of the line element is in an elongate condition thereof;

when the delivery element is in the retracted condition thereof, the outer portion of the line element is in a stored condition thereof; and movement of the outer portion of the line element between the elongate condition and the stored condition corresponds to movement of the delivery element between the extended condition and the retracted condition.

15. The system according to claim 14 in which the outer portion of the line element is biased to the stored condition thereof.

16. The system according to claim 15 in which the outer portion of the line element defines a directional axis when the outer portion of the line element is in the elongate condition.

17. The system according to claim 16 in which the outer portion of the line element defines the directional axis when the outer portion of the line element is in the stored condition.

18. The system according to claim 17 in which the structure assembly comprises:

a structure;

a reel comprising a reel body rotatable about a reel axis thereof, the reel body being rotatably mounted to the structure;

the inner end of the line element being secured to the reel body, and an inner portion of the line element being wound around the reel body when the delivery element is in the retracted condition;

the structure comprising a channel therein through which the line element is partially receivable, the channel being defined by a channel axis;

when the delivery element is moved from the retracted condition toward the extended condition, the reel body is rotated to at least partially unwind the inner portion from the reel body; and upon movement of the delivery element from the extended condition toward the retracted condition, the reel body is rotated to at least partially wind the inner portion of the line element onto the reel body.

19. The system according to claim 15 in which:

the upper portion comprises an aperture element defining the aperture and defining a plane transverse to an aperture axis that is defined by the aperture; and when the delivery element is in the retracted condition thereof, the upper portions are positioned with the respective planes defined by the respective aperture elements aligned with the respective segments of the delivery element at the locations at which the body portions are secured, and when the delivery element is in the extended condition thereof, the upper portions are positioned with the respective planes defined by the respective aperture elements positioned transverse to the respective segments of the delivery element at the respective locations at which the body portions are secured.

20. The system according to claim 13 in which the upper portion is pivotable about an upper portion axis defined by the body portion, the upper portion axis being transverse to an aperture axis defined by the aperture.

\* \* \* \* \*